United States Patent
Dalla Libera et al.

(10) Patent No.: US 11,977,161 B2
(45) Date of Patent: May 7, 2024

(54) MOBILE ROBOT AND CONTROL METHOD

(71) Applicant: Panasonic Intellectual Property Management Co., Ltd., Osaka (JP)

(72) Inventors: Fabio Dalla Libera, Osaka (JP); Yuko Tsusaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1117 days.

(21) Appl. No.: 16/447,239

(22) Filed: Jun. 20, 2019

(65) Prior Publication Data

US 2020/0004263 A1 Jan. 2, 2020

(30) Foreign Application Priority Data

Jun. 28, 2018 (JP) .................. 2018-123541

(51) Int. Cl.
| | |
|---|---|
| *G01S 17/89* | (2020.01) |
| *A47L 11/40* | (2006.01) |
| *B25J 11/00* | (2006.01) |
| *G01S 17/931* | (2020.01) |
| *G05D 1/00* | (2006.01) |
| *G05D 1/02* | (2020.01) |

(52) U.S. Cl.
CPC .......... *G01S 17/89* (2013.01); *A47L 11/4061* (2013.01); *B25J 11/0085* (2013.01); *G01S 17/931* (2020.01); *G05D 1/0219* (2013.01); *G05D 1/0238* (2013.01); *A47L 2201/04* (2013.01); *G05D 2201/0215* (2013.01)

(58) Field of Classification Search
None
See application file for complete search history.

(56) References Cited

U.S. PATENT DOCUMENTS

| | | | |
|---|---|---|---|
| 2017/0100007 A1 | 4/2017 | Matsumoto et al. | |
| 2019/0056739 A1* | 2/2019 | Sunil Kumar | ....... G05D 1/0268 |
| 2019/0061156 A1* | 2/2019 | Li | ....... G05D 1/0274 |

FOREIGN PATENT DOCUMENTS

| | | |
|---|---|---|
| WO | 2016/002186 | 1/2016 |
| WO | 2018/043180 | 3/2018 |

* cited by examiner

*Primary Examiner* — Lail A Kleinman
(74) *Attorney, Agent, or Firm* — WENDEROTH, LIND & PONACK, L.L.P.

(57) ABSTRACT

A cleaning device includes: a range finding sensor; an acquisition unit which acquires a map and a first path along which the cleaning device is to move; a first identification unit which identifies a feature point which is a point where a distance between the object and the range finding sensor varies; a second identification unit which identifies a virtual point which is, among points on a virtual line segment, a point closest to the first path when the virtual line segment does not intersect with the first path, the virtual line segment extending toward the first path from the feature point, and having a maximum length within the predetermined range-finding range; a converter which converts the first path into a second path which passes through the virtual point; and a motor controller which causes the cleaning device to move along the second path.

4 Claims, 28 Drawing Sheets

(a)

(b)

(c)

(d)

MOBILE ROBOT AND CONTROL METHOD

CROSS REFERENCE TO RELATED APPLICATION

This application claims the benefit of priority of Japanese Patent Application Number 2018-123541 filed on Jun. 28, 2018, the entire content of which is hereby incorporated by reference.

BACKGROUND

1. Technical Field

The present disclosure relates to a mobile robot, and a control method.

2. Description of the Related Art

Conventionally, an autonomous travel type cleaning device is disclosed which autonomously travels on a cleaning surface in order to suck in dust present on the cleaning surface (see International Publication No. WO2016/002186).

SUMMARY

However, a mobile robot, such as a conventional autonomous travel type cleaning device, has room for improvement with respect to setting of a movement path.

In view of the above, one aspect of the present disclosure provides a mobile robot which can move along a more appropriate movement path.

A mobile robot according to an aspect of the present disclosure is a mobile robot which moves in an environment and includes: a range finding sensor having a predetermined range-finding range; an acquisition unit which acquires a map of the environment including position information of an object, and a first path along which the mobile robot is to move in the environment; a first identification unit which identifies a feature point which is, among points each indicating a position of the object on the map, a point where, as viewed from a direction toward the point from the mobile robot, a distance between the object and the range finding sensor varies with movement of the mobile robot along the first path; a second identification unit which identifies a virtual point which is, among points on a virtual line segment, a point closest to the first path when the virtual line segment does not intersect with the first path, the virtual line segment extending toward the first path from the feature point, and having a maximum length within the predetermined range-finding range; a converter which converts the first path into a second path which passes through the virtual point; and a drive unit which causes the mobile robot to move along the second path.

Generic and specific aspects may be implemented using a system, a method, an integrated circuit, a computer program, or a computer-readable recording medium, such as a CD-ROM. Alternatively, the aspect may be implemented by any combination of systems, methods, integrated circuits, computer programs, and recording mediums.

The mobile robot of one aspect of the present disclosure can move along a more appropriate movement path.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
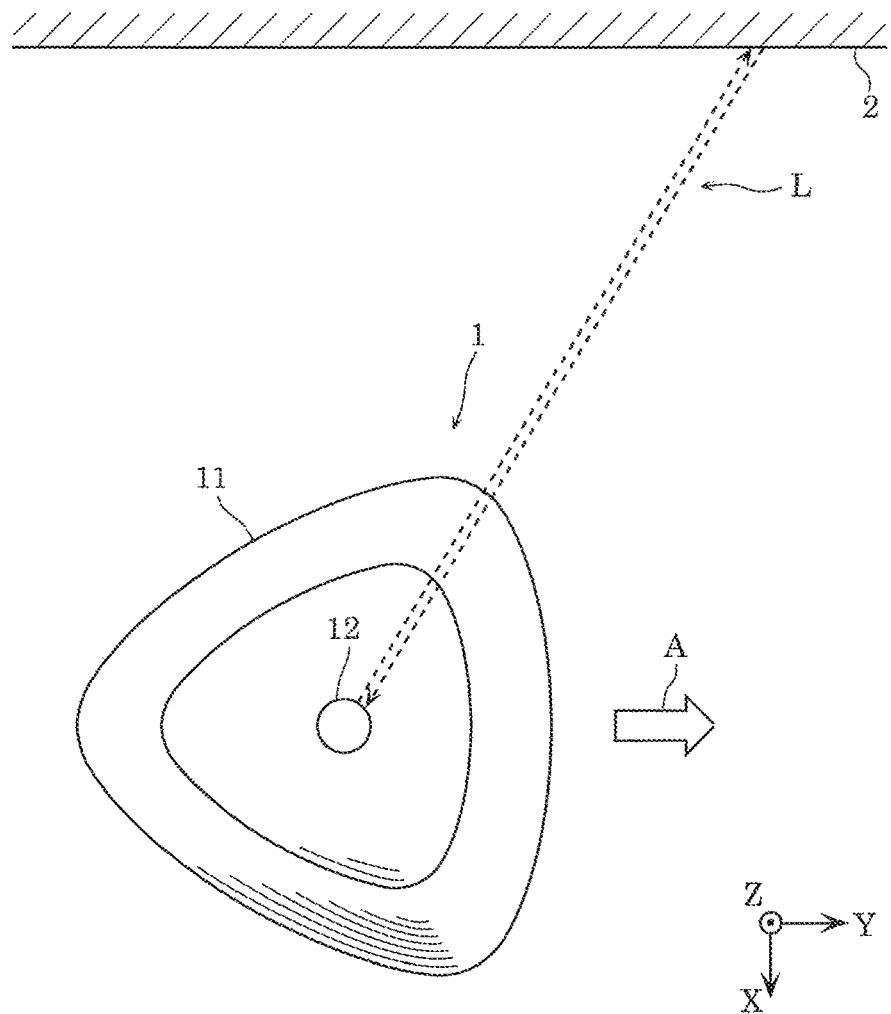
FIG. 1 is a top plan view schematically showing the external appearance of a cleaning device according to Embodiment 1.

A mobile robot according to an aspect of the present disclosure is a mobile robot which moves in an environment and includes: a range finding sensor having a predetermined range-finding range; an acquisition unit which acquires a map of the environment including position information of an object, and a first path along which the mobile robot is to move in the environment; a first identification unit which identifies a feature point which is, among points each indicating a position of the object on the map, a point where, as viewed from a direction toward the point from the mobile robot, a distance between the object and the range finding sensor varies with movement of the mobile robot along the first path; a second identification unit which identifies a virtual point which is, among points on a virtual line segment, a point closest to the first path when the virtual line segment does not intersect with the first path, the virtual line segment extending toward the first path from the feature point, and having a maximum length within the predetermined range-finding range; a converter which converts the first path into a second path which passes through the virtual point; and a drive unit which causes the mobile robot to move along the second path.

With such a configuration, in the case where self-position estimation is not appropriately performed if the mobile robot moves along the first path, the mobile robot changes the path to a path along which the mobile robot passes through a position at which the range finding sensor can detect a feature point. Accordingly, the mobile robot detects a feature point during movement and hence, self-position estimation can be appropriately performed. Therefore, the mobile robot can move along a more appropriate movement path.

Furthermore, the feature point may be a vertex on a borderline of a region where the mobile robot is capable of moving, the region being defined by the object on the map.

With such a configuration, the mobile robot detects, as a feature point, a vertex on the borderline of a region where the mobile robot is capable of moving. Accordingly, the mobile robot uses the vertex on the borderline as a feature point and hence, the mobile robot can perform self-position estimation more easily.

Furthermore, the virtual line segment may be set on a bisector which bisects an angle formed by the borderline at the vertex.

With such a configuration, the mobile robot sets a virtual point on a virtual line segment which is set to a position equidistantly away from two borderlines forming the vertex. Accordingly, the virtual line segment having the feature point at one end of the virtual line segment is set to a position away from respective two borderlines as much as possible. As a result, the virtual point is set to a position away from respective two borderlines as much as possible. Therefore, the mobile robot can move along a more appropriate movement path with the shorter length of a path which is to be added in performing the conversion from the first path into the second path.

Furthermore, the feature point may be a point closest to the first path among points on a curved portion included in a borderline of a region where the mobile robot is capable of moving, the region being defined by the object on the map.

With such a configuration, the mobile robot detects, as a feature point, a point closest to the first path among points on a curved portion included in the borderline of the region where the mobile robot is capable of moving. Accordingly, the mobile robot uses the above-mentioned point as a feature point and hence, the mobile robot can perform self-position estimation more easily.

Furthermore, the virtual line segment may be set on a straight line which passes through the point closest to the first path among the points on the curved line, and perpendicularly intersects with the first path.

With such a configuration, the mobile robot sets a virtual point on the virtual line segment which is set to a position equidistantly away from the borderlines. Accordingly, the virtual line segment having the feature point at one end of the virtual line segment is set to a position away from the borderlines as much as possible. As a result, the virtual point is set to a position away from the borderlines as much as possible. Therefore, the mobile robot can move along a more appropriate movement path with the shorter length of a path which is to be added in performing the conversion from the first path into the second path.

Furthermore, the converter may convert the first path into the second path by adding, to the first path, a path where the mobile robot moves back and forth on a line segment connecting a point on the first path closest to the virtual point and the virtual point.

With such a configuration, the mobile robot can move along a more appropriate movement path with the shorter length of a path which is to be added in performing the conversion from the first path into the second path.

Furthermore, the second identification unit may identify, as the virtual point, a point, among the points on the virtual line segment, where a distance between the point and the first path is shortest and is a distance at which range finding is performable by the range finding sensor.

With such a configuration, the mobile robot sets a virtual point within a range where range finding can be performed by the range finding sensor from the position on the first path. Accordingly, it is possible to avoid that the length of a path which is to be added in performing the conversion from the first path into the second path becomes excessively greater than the distance at which range finding can be performed by the range finding sensor.

Furthermore, the second identification unit may identify a first point and a second point each of which is the virtual point, and the converter may prohibit conversion of the first path into the second path which passes through the second point, when a distance from a third point, which is a point on the first path closest to the first point, to a fourth point, which is a point on the first path closest to the second point, is equal to or less than a distance from the second point to the fourth point, and the mobile robot passes through the third point and the fourth point in this order in the first path.

With such a configuration, in the case where it is assumed to convert the first path into the second path, thus causing the path to pass through the virtual point, if a relatively long distance is required for the mobile robot to return to the first path from the above-mentioned virtual point, it is possible to prevent the above-mentioned conversion from being performed. This is because in the case where the mobile robot moves along the second path, a larger difference may be assumed between the self-position estimated by the mobile robot and the actual position. Accordingly, avoiding an increase in error in self-position estimation allows the mobile robot to move along a more appropriate movement path.

A method for controlling a mobile robot according to an aspect of the present invention is a method for controlling a mobile robot which moves in an environment and includes a range finding sensor having a predetermined range-finding range, the method including: acquiring a map of the environment including position information of an object, and a first path along which the mobile robot is to move in the environment; identifying a feature point which is, among points each indicating a position of the object on the map, a point where, as viewed from a direction toward the point from the mobile robot, a distance between the object and the range finding sensor varies with movement of the mobile robot along the first path; identifying a virtual point which is, among points on a virtual line segment, a point closest to the first path when the virtual line segment does not intersect with the first path, the virtual line segment extending toward the first path from the feature point, and having a maximum length within the predetermined range-finding range; converting the first path into a second path which passes through the virtual point; and causing the mobile robot to move along the second path.

Accordingly, the same advantageous effect as with the above-described mobile robot can be produced.

A mobile robot according to an aspect of the present disclosure is a mobile robot which moves in an environment, and includes: a range finding sensor having a predetermined range-finding range; and an acquisition unit which acquires a map of the environment including position information of an object, and a first path along which the mobile robot is to move in the environment, wherein the environment includes at least a first region and a second region, the environment is defined by a plurality of corners and a plurality of wall surfaces which surround the environment, a first corner of the plurality of corners is in contact with the first region and the second region, the mobile robot moves to satisfy at least one of first movement and second movement, the first movement is movement where, after the mobile robot enters the second region from the first region, the mobile robot moves such that one of the plurality of wall surfaces defining the second region is positioned within the range-finding range, and the mobile robot moves to the first region from the second region, and the second movement is movement where, after the mobile robot enters the first region from the second region, the mobile robot moves such that one of the plurality of wall surfaces defining the first region is positioned within the range-finding range, and the mobile robot moves to the second region from the first region.

With such a configuration, the mobile robot moves in a second region after the movement in the first region is finished. Further, the mobile robot can return to the charger installed in the first region after the mobile robot moves through regions included in an environment in sequence. As described above, the mobile robot can move along a more appropriate movement path.

Furthermore, the mobile robot may move along one of the plurality of wall surfaces defining the first region, to satisfy the first movement in entering the second region, and the mobile robot may move along one of the plurality of wall surfaces defining the second region so as not to satisfy the second movement in entering the first region.

With such a configuration, the mobile robot can move along a more appropriate movement path more easily.

These generic and specific aspects may be implemented using a system, a method, an integrated circuit, a computer program, or a computer-readable recording medium, such as a CD-ROM. Alternatively, the aspect may be implemented by any combination of systems, methods, integrated circuits, computer programs, and recording mediums.

Hereinafter, Embodiments are specifically described with reference to drawings.

Each of Embodiments described below shows a general or specific example. The numerical values, shapes, materials, constitutional elements, the arrangement position and connection mode of the constitutional elements, steps, the order of the steps and the like described in Embodiments below are only examples, and are not intended to limit the present disclosure. Further, among the constitutional elements in Embodiments below, constitutional elements not described in the independent claims indicating the most generic concept are described as arbitrary constitutional elements.

Embodiment

Cleaning device 1 which is an example of a mobile robot in this embodiment will be described. The mobile robot can be also used not only as cleaning device 1, but also as a mobile robot for performing various sensing, a transport robot which transports products, a communication robot which communicates with humans or the like. A movement path is also simply referred to as "path".

Figure 2:
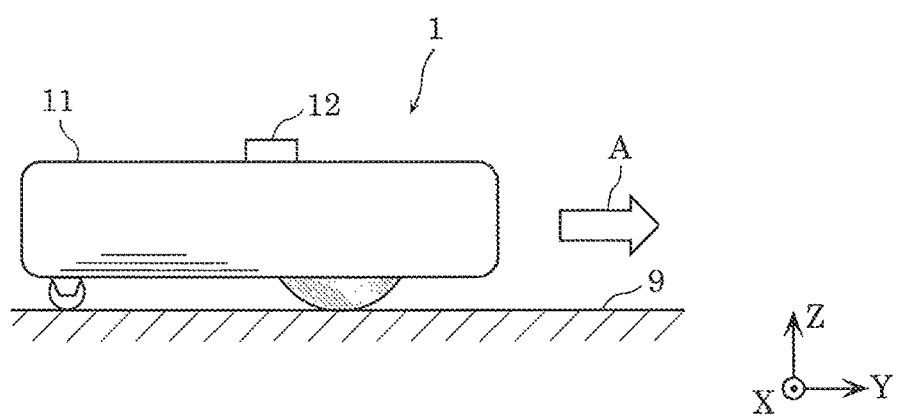
FIG. 2 is a side view schematically showing the external appearance of the cleaning device according to Embodiment 1.

FIG. 1 and FIG. 2 are respectively a top plan view and a side view schematically showing the external appearance of cleaning device 1 of this embodiment. The operation of cleaning device 1 is described with reference to these drawings. In the description made hereinafter, the description may be made using an X coordinate axis, a Y coordinate axis, and a Z coordinate axis which are shown in the respective drawings. A plus direction in the Z axis is also referred to as an upward direction.

Cleaning device 1 autonomously travels on cleaning surface 9 in an environment in order to clean cleaning surface 9. Cleaning device 1 autonomously decides a movement path for cleaning device 1, and sucks in dust and the like present on cleaning surface 9 while moving along the decided movement path. A movement path is also simply referred to as "path". One example of the environment may be an indoor space including a space in housing, office buildings, or commercial buildings. The movement path of cleaning device 1 may be decided by performing self-position estimation and by forming a map using SLAM technology (Simultaneous Localization and Mapping). For example, cleaning device 1 measures the distance to objects around cleaning device 1 including wall 2, using light L, and performs a comparison with a map which cleaning device 1 contains. With such operations, the position of cleaning device 1 on the map is estimated and, further, a new portion of the map is formed. A control is performed so as to allow cleaning device 1 to move along the movement path which cleaning device 1 contains based on the estimated position of cleaning device 1. Cleaning device 1 moves in principle in a direction indicated by arrow A. The term "move" may also be expressed as "advance" or "travel". Furthermore, the direction indicated by arrow A may also be expressed as "moving direction", "advancing direction", or "traveling direction".

Figure 3:
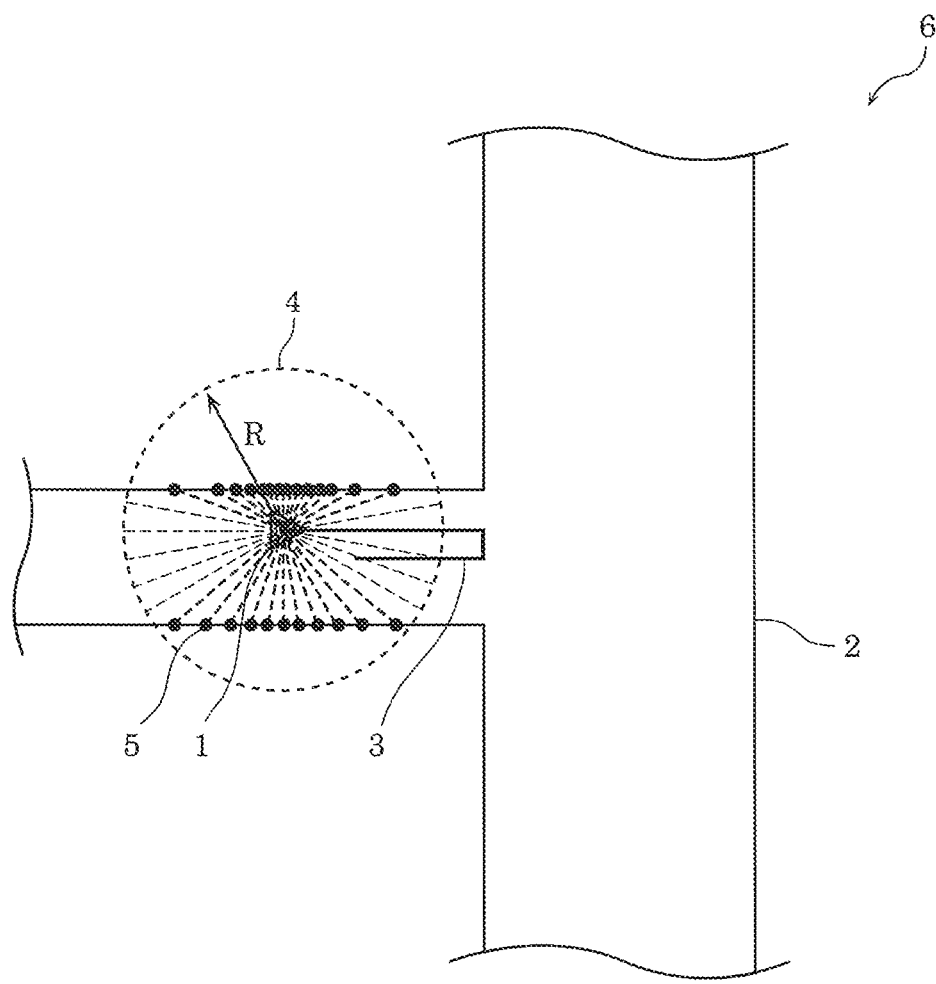
FIG. 3 illustrates first explanatory views showing the positional relationship between the cleaning device according to Embodiment 1 and objects around the cleaning device.

FIG. 3 is a first explanatory view showing the positional relationship between cleaning device 1 according to this embodiment and objects around cleaning device 1. Map 6 shown in FIG. 3 corresponds to a two-dimensional map of an environment as viewed from above. In map 6, a space is defined by walls 2 which form the profile of a region where cleaning device 1 is capable of moving. In map 6 shown in FIG. 3, objects around cleaning device 1 are walls 2. Map 6 may include positions of obstacles around cleaning device 1 as objects around cleaning device 1. Map 6 also shows path 3 of cleaning device 1. Map 6 also shows current position of cleaning device 1, and region 4 having radius R where cleaning device 1 can perform range finding using light L. Cleaning device 1 can measure a distance to object 5 closest from cleaning device 1 on the optical path of light L using light L.

There is a problem that self-position estimation is not appropriately performed depending on the positional relationship between cleaning device 1 and objects around cleaning device 1. A case where such a problem is caused, and a case where such a problem is not caused are described by giving examples.

Figure 4:
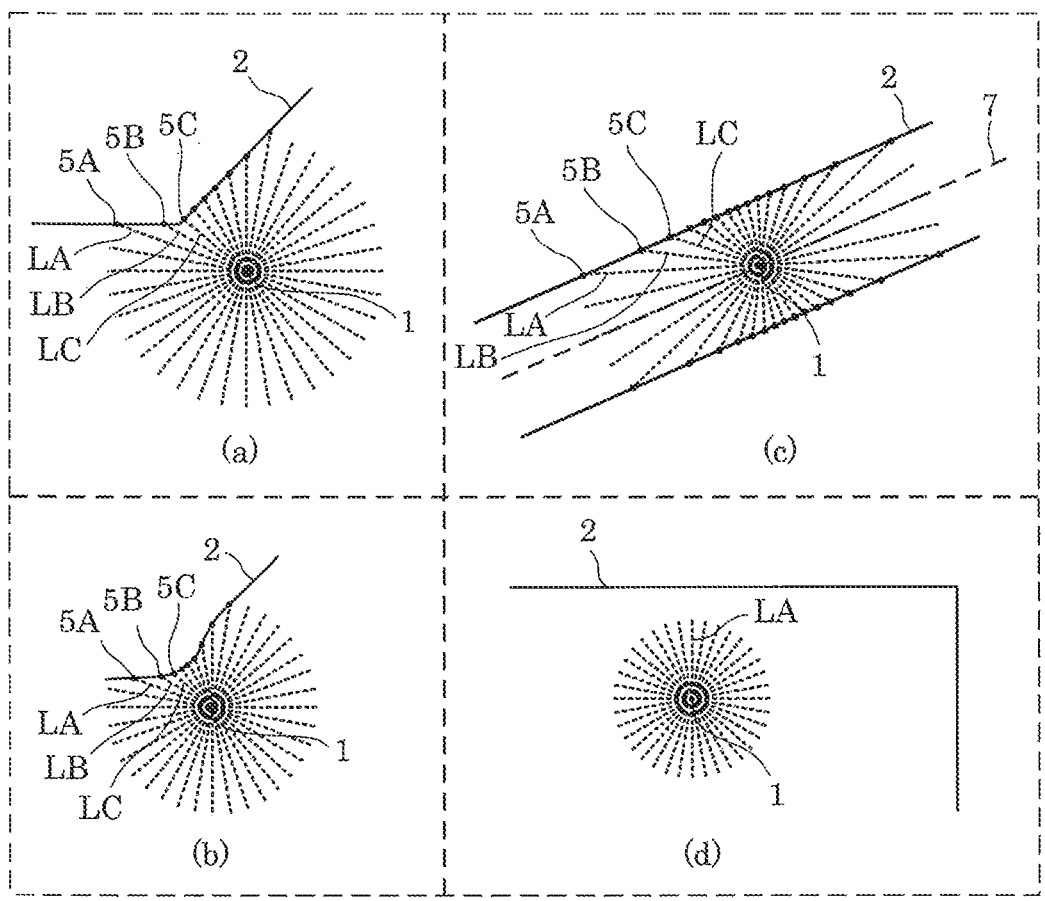
FIG. 4 illustrates second explanatory views showing the positional relationship between the cleaning device according to Embodiment 1 and objects around the cleaning device.

FIG. 4 is a second explanatory view showing the positional relationship between cleaning device 1 according to this embodiment and objects around cleaning device 1.

Each of (a) and (b) in FIG. 4 shows an example where self-position estimation is appropriately performed by cleaning device 1.

For example, in (a) in FIG. 4, cleaning device 1 is at a position at which cleaning device 1 can perform range finding on wall 2 which is formed of two planes connected with each other. Cleaning device 1 measures distances to respective objects 5A, 5B, 5C, and the like, which are portions of wall 2, using lights LA, LB, LC, and the like. Measured distances are distances specific to the current position of cleaning device 1. In other words, at a position different from the current position of cleaning device 1, distances different from these measured distances are measured, except by coincidence. Accordingly, cleaning device 1 can perform self-position estimation by collating these measured distances with distances from cleaning device 1 to objects on a map which is contained in cleaning device 1. In (b) in FIG. 4, cleaning device 1 is at a position at which cleaning device 1 can perform range finding on wall 2 having a curved surface so that the same description applies for this case.

Each of (c) and (d) in FIG. 4 shows an example where a problem occurs in self-position estimation performed by cleaning device 1.

For example, in (c) in FIG. 4, cleaning device 1 is at a position at which cleaning device 1 can perform range finding on walls 2 which are two planes parallel to each other. Cleaning device 1 measures distances to respective objects 5A, 5B, 5C, and the like using lights LA, LB, LC, and the like. Provided that cleaning device 1 is on straight line 7 parallel to walls 2, the same measured distances are acquired at any position. For this reason, cleaning device 1 cannot identify where cleaning device 1 is positioned on straight line 7 even with the use of distances measured as described above. As described above, cleaning device 1 cannot estimate current self-position with a method which uses light.

Further, in (d) in FIG. 4, there is no wall 2 within a region where cleaning device 1 can perform range finding. Accordingly, cleaning device 1 cannot receive reflected light, such as light LA, at all and hence, cleaning device 1 cannot estimate self-position.

As described above, in the case where the position of cleaning device 1 cannot be uniquely identified from the positional relationship between cleaning device 1 and objects around cleaning device 1, self-position estimation is not appropriately performed by cleaning device 1. If a period during which self-position estimation is not performed becomes relatively long, a difference between the self-position estimated by cleaning device 1 and the actual position of cleaning device 1 increases and hence, cleaning device 1 cannot move along an appropriate movement path.

According to cleaning device 1 according to this embodiment, in the case where cleaning device 1 is planned to move to a position at which the position of cleaning device 1 cannot be uniquely identified from the positional relationship between cleaning device 1 and wall 2, the movement path is appropriately varied so as to allow self-position estimation to be appropriately performed. With such variation, cleaning device 1 can appropriately perform self-position estimation and, as a result, can move along an appropriate movement path.

The detailed configuration and processing of cleaning device 1 are described hereinafter.

Figure 5:
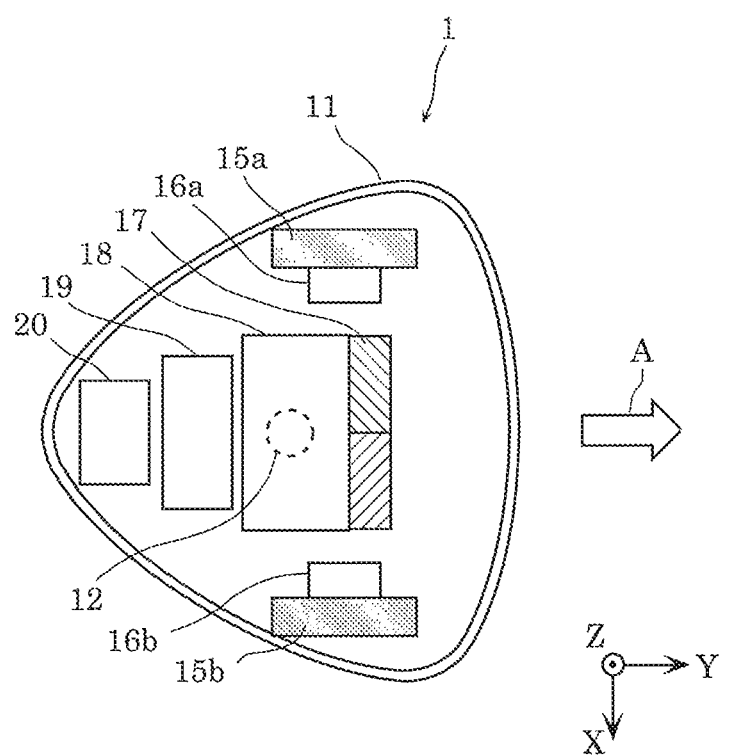
FIG. 5 is a top plan view schematically showing the internal structure of the cleaning device according to Embodiment 1.

FIG. 5 is a top plan view schematically showing the internal structure of cleaning device 1 of this embodiment.

As shown in FIG. 5, cleaning device 1 includes: casing 11; range finding sensor 12; wheels 15a and 15b; motors 16a and 16b; suction portion 17; dust box 18; control circuit 19; and power source 20.

Casing 11 is the casing of cleaning device 1, and defines the profile of cleaning device 1. Casing 11 has a substantially triangular shape as viewed in a top plan view. However, casing 11 may adopt any shape. For example, casing 11 may have any shape, such as a circular shape, a quadrangular shape, or a pentagonal shape. Further, each of the size of casing 11 in the X axis direction and the size of casing 11 in the Y axis direction is approximately 30 cm, and the size of casing 11 in the Z axis direction is approximately 10 cm, for example. However, the size of casing 11 is not limited to such sizes.

Range finding sensor 12 measures a distance between objects present around cleaning device 1 and range finding sensor 12. Range finding sensor 12 may be achieved by a laser range finder or a LiDAR (Light Detection and Ranging) device which measures the distance to objects around cleaning device 1 using light, for example.

Range finding sensor 12 is disposed in an exposed manner from the upper surface of casing 11. Range finding sensor 12 includes a light emitter and a light receiver. The light emitter emits a light beam in a direction parallel to the XY plane. The light receiver receives a light beam from the direction along which the light emitter emits the light beam. The light emitter emits a light beam and the light receiver receives a light beam while the light emitter and the light receiver rotate about an axis extending parallel to the Z axis direction. With such operations, the distance to objects present around cleaning device 1 is measured. The speed of rotation may be five times in one second, for example. Range finding sensor 12 may emit light 60 times in a period of one rotation, for example. Range finding sensor 12 has a predetermined measurement distance. For example, the maximum value of the predetermined measurement distance is assumed as a first distance. The first distance varies depending on the performance of the laser range finder or the LiDAR. The first distance may be several meters or more and several hundred meters or less, for example.

Wheels 15a and 15b are wheels which cause cleaning device 1 to move. Rotary shafts of wheels 15a and 15b are fixed to casing 11, and casing 11 moves with rotations of wheels 15a and 15b. The rotation of wheel 15a and the rotation of wheel 15b are respectively controlled by motor 16a and motor 16b in an independent manner. The material for forming wheels 15a and 15b is rubber, nylon or the like.

Motors 16a and 16b respectively control the rotation of wheel 15a and the rotation of wheel 15b in an independent manner. Motor 16a causes wheel 15a to rotate or stop under the control performed by control circuit 19. Motor 16b causes wheel 15b to rotate or stop under the control performed by control circuit 19. Further, providing a difference in rotational speed between motor 16a and motor 16b allows cleaning device 1 to vary the direction, that is, allows cleaning device 1 to change the direction.

Suction portion 17 sucks in dust present on cleaning surface 9. Suction portion 17 sucks in dust together with air through a suction port (not shown in the drawing) disposed on the bottom surface of casing 11. Suction portion 17 also discharges sucked dust to dust box 18. The width of suction portion 17, that is, the length in the X axis direction of suction portion 17 may be approximately 15 cm, for example. However, the width of suction portion 17 is not limited to such a width. The suction operation of suction portion 17 is controlled by control circuit 19.

Dust box 18 is an accommodation space which accommodates dust, sucked by suction portion 17 together with air, in a state where dust and air are separated from each other by a filter.

Control circuit 19 controls various functions of cleaning device 1. To be more specific, control circuit 19 decides the movement path of cleaning device 1, and controls motors 16a and 16b such that cleaning device 1 moves along the decided movement path. Control circuit 19 can be achieved with the execution of a program by a processor.

In performing cleaning processing, control circuit 19 acquires distances to objects around cleaning device 1 using range finding sensor 12. Then, control circuit 19 decides the movement path of cleaning device 1 based on an SLAM technology, and controls motors 16a and 16b, thus causing cleaning device 1 to travel.

Power source 20 is a power source apparatus which supplies power to respective constitutional elements of cleaning device 1. Power source 20 may be a secondary battery, for example. To be more specific, power source 20 is a lithium ion battery.

In addition to the above-mentioned constitutional elements, cleaning device 1 may also include constitutional elements, such as a terminal to be connected to a charger for supplying power to power source 20, and a brush for sweeping together dust on cleaning surface 9.

Next, control circuit 19 is described in more detail.

Figure 6A:
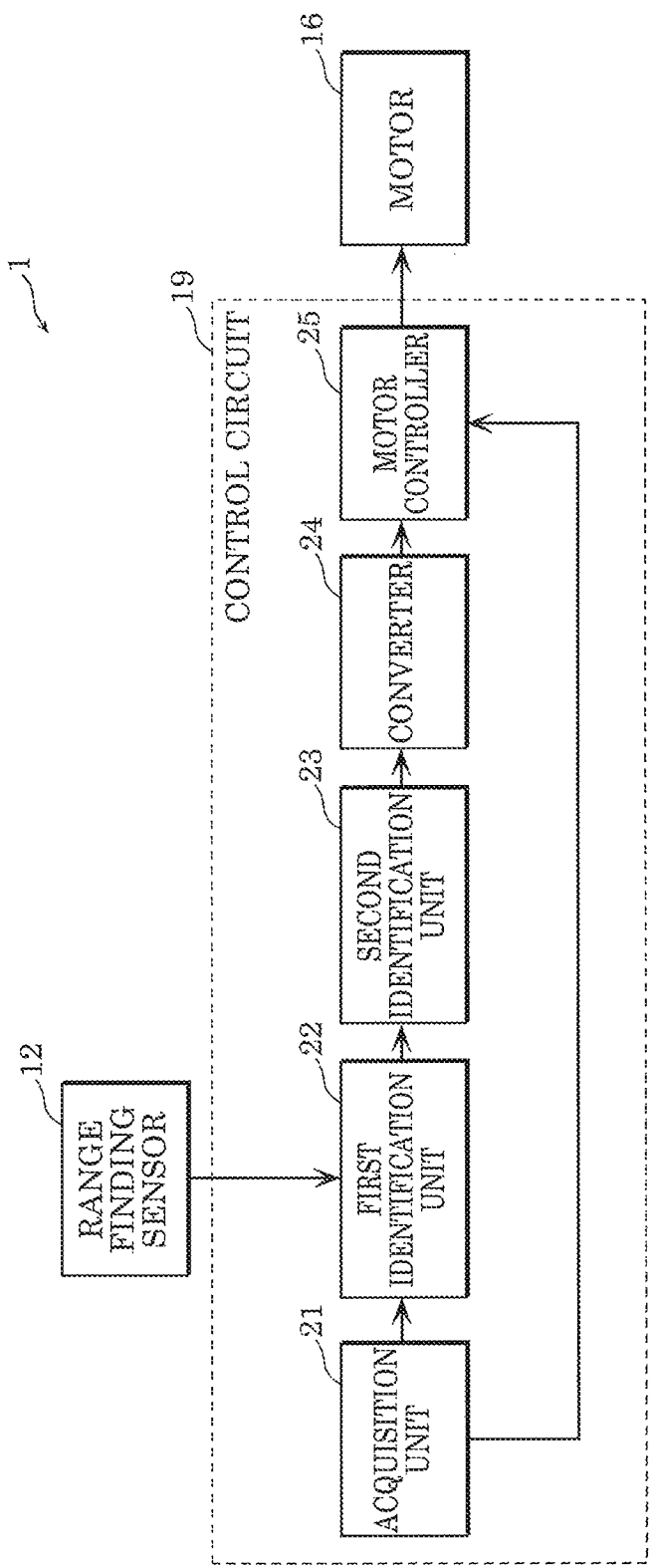
FIG. 6A is a block diagram showing the function of a control circuit of the cleaning device according to the embodiment in detail.

FIG. 6A is a block diagram showing the function of control circuit 19 of cleaning device 1 of this embodiment in detail.

As shown in FIG. 6A, control circuit 19 includes acquisition unit 21, first identification unit 22, second identification unit 23, converter 24, and motor controller 25.

Acquisition unit 21 acquires information relating to the movement path of cleaning device 1. To be more specific, acquisition unit 21 acquires a map of an environment and a first path, the map including position information of objects, the first path being a path along which cleaning device 1 is to move in the environment. The map acquired by acquisition unit 21 is information showing the positions of objects present around cleaning device 1. For example, the map is information showing whether or not objects are present in respective cells obtained by dividing a region, where cleaning device 1 is capable of moving, into the cells by a grid as viewed in a top plan view. A path acquired by acquisition unit 21 is a path planned as the movement path of cleaning device 1, and is also referred to as "first path". Map information is also simply referred to as "map". Path information is also simply referred to as "path".

First identification unit 22 identifies a feature point. The feature point is a point, among points each indicating a position of objects on the map, where, as viewed from a direction toward the point from cleaning device 1, a distance between an object and range finding sensor 12 varies with movement of cleaning device 1 along the first path. For example, in (a) and (b) in FIG. 4, when cleaning device 1 moves non-parallel to wall 2, points indicating objects 5A, 5B, 5C, and the like can be identified as feature points. Further, in (c) in FIG. 4, when cleaning device 1 moves parallel to walls 2, that is, when cleaning device 1 moves on straight line 7, any points on walls 2 cannot be identified as a feature point.

Second identification unit 23 identifies a virtual point. The virtual point is, among points on a virtual line segment, the point which is closest to the first path (with respect to a some distance, for instance, Euclidean distance or Manhattan distance) in the case where the virtual line segment does not intersect with the first path, the virtual line segment extending toward the first path from the feature point, and having the maximum length within the predetermined range-finding range. In identifying the virtual point, second identification unit 23 may identify, as the virtual point, a point, among the points on the virtual line segment, where a distance between the point and the feature point is predetermined distance S, and is the minimum length. Predetermined distance S is equal to or less than distance R at which range finding can be performed by range finding sensor 12. The above-mentioned predetermined distance S is set to a value which falls within a range from 0.5×R to 0.6×R, for example. To be more specific, predetermined distance S is set to 0.54×R (S=0.54×R), for example. With smaller predetermined distance S, it is possible to obtain an advantageous effect of improving more accuracy in self-position estimation by increasing the number of feature points which can be used for self-position estimation. On the other hand, with larger predetermined distance S, it is possible to obtain an advantageous effect of reducing the length of the path which is to be added due to the conversion of the path.

Converter 24 converts the first path to a path which passes through the virtual point. For example, converter 24 adds, to the first path, a path where cleaning device 1 moves back and forth on a line segment connecting the virtual point and a point on the first path closest to the virtual point, thus converting the first path. In this embodiment, a path converted by converter 24 is also referred to as "second path". It is also safe to say that converter 24 converts the first path, thus newly generating a second path which passes through the virtual point.

Motor controller 25 is a control device which controls the driving of motor 16 based on the control performed by control circuit 19. To be more specific, motor controller 25 drives motor 16 such that cleaning device 1 moves along a second path generated by converter 24 through conversion. Motor controller 25 corresponds to a drive unit.

In this embodiment, a feature point and a virtual line segment are set as follows, for example. One example of the feature point is a vertex on the borderline of a region where cleaning device 1 is capable of moving. In this case, the virtual line segment is set on a bisector which bisects an angle formed by borderlines at the vertex.

Another example of the feature point is a point closest to the first path, among points on a curved portion included in the borderline of the region where cleaning device 1 is capable of moving. In this case, the virtual line segment is set on a straight line which passes through a point closest to the first path, among points on a curved line, and which perpendicularly intersects with the first path. Setting of the feature point and virtual line segment is described later in detail by giving specific examples.

Figure 6B:
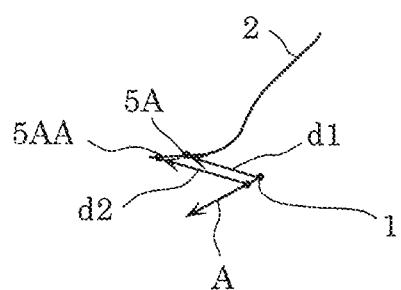
FIG. 6B is a first explanatory view of a distance between an object and a range finding sensor in the embodiment.
Figure 6C:
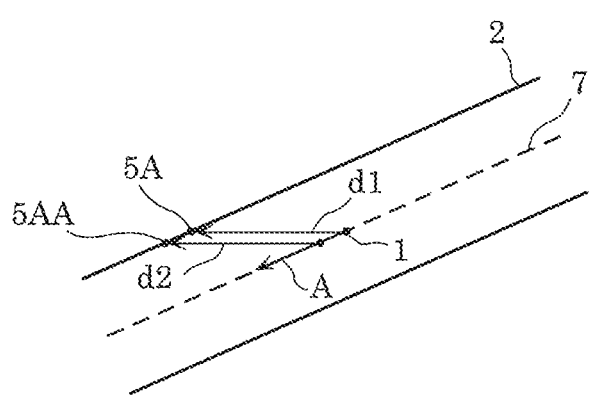
FIG. 6C is a second explanatory view of a distance between the object and the range finding sensor in the embodiment.

Next, a distance between range finding sensor 12 and objects is described. FIG. 6B and FIG. 6C are explanatory views of a distance between an object and range finding sensor 12 in this embodiment.

FIG. 6B shows a distance between object 5A and range finding sensor 12 as viewed from a direction toward the point indicating object 5A from cleaning device 1 in the case where cleaning device 1 moves non-parallel to wall 2 in (b) in FIG. 4. The direction toward the point indicating object 5A from cleaning device 1 is indicated by arrow d1 in FIG. 6B. A distance from cleaning device 1 to the point indicating object 5A is indicated by the length of arrow d1.

Suppose that cleaning device 1 moves in a direction indicated by arrow A. In such a case, range finding sensor 12 detects a point indicated by "5AA" on wall 2 in the above-mentioned direction. After cleaning device 1 moves, the distance from cleaning device 1 to the point indicating the object in the above-mentioned direction becomes the distance indicated by the length of arrow d2. Accordingly, the distance varies from the distance indicated by the length of arrow d1.

In this case, first identification unit 22 determines that a distance between the object and range finding sensor 12 as viewed from the above-mentioned direction varies due to the above-mentioned movement, thus identifying the point indicating object 5A as a feature point.

FIG. 6C shows a distance between object 5A and range finding sensor 12 as viewed from a direction toward the point indicating object 5A from cleaning device 1 in the case where cleaning device 1 moves parallel to walls 2 in (c) in FIG. 4. The direction toward the point indicating object 5A from cleaning device 1 is indicated by arrow d1 in FIG. 6C. The distance from cleaning device 1 to the point indicating object 5A is indicated by the length of arrow d1.

Suppose that cleaning device 1 moves in the direction indicated by arrow A. In such a case, range finding sensor 12 detects a point indicated by "5AA" on wall 2 in the above-mentioned direction. After cleaning device 1 moves, the distance from cleaning device 1 to the point indicating the object in the above-mentioned direction becomes the distance indicated by the length of arrow d2. This distance is equal to the distance indicated by the length of arrow d1.

In this case, first identification unit 22 determines that a distance between the object and range finding sensor 12 as viewed from the above-mentioned direction does not vary due to the above-mentioned movement. Accordingly, there is no possibility that first identification unit 22 identifies the point indicating object 5A as a feature point.

Figure 7:
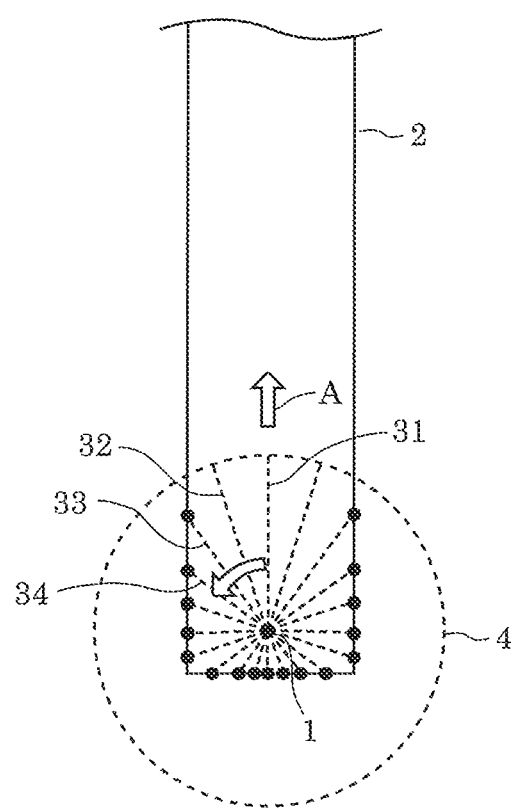
FIG. 7 is an explanatory view showing one example of a region where range finding is performable by a range finding sensor in Embodiment 1.
Figure 8:
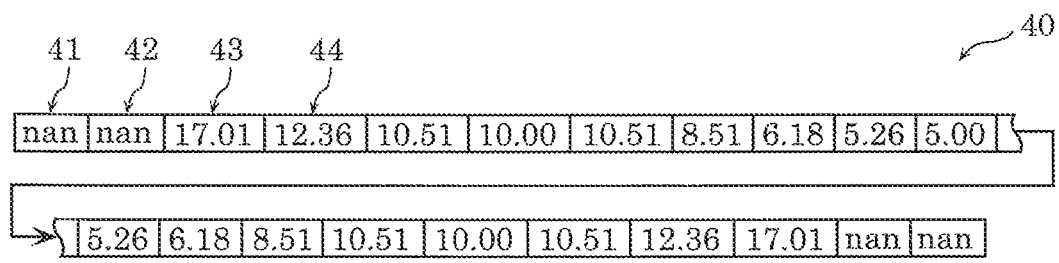
FIG. 8 is an explanatory view showing one example of results of distance measurement performed by the range finding sensor in Embodiment 1.

Next, range finding performed by range finding sensor 12 is described. FIG. 7 is an explanatory view showing one example of a region where range finding is performable by range finding sensor 12 in this embodiment. FIG. 8 is an explanatory view showing one example of results of distance measurement performed by range finding sensor 12 in this embodiment.

As shown in FIG. 7, range finding sensor 12 sequentially emits light to an area around cleaning device 1 while rotating. For example, first, range finding sensor 12 emits light in a direction parallel to the moving direction indicated by arrow A. That is, range finding sensor 12 emits light along optical path 31. Thereafter, range finding sensor 12 sequentially emits light along optical paths 32, 33 and 34 in a counterclockwise direction on the paper on which FIG. 7 is shown. In FIG. 7, region 4 is a region where range finding is performable by range finding sensor 12. The light may be emitted in a clockwise direction.

Data row 40 shown in FIG. 8 is data of distance measured by light received through optical path 31 and the like shown in FIG. 6A. Data 41, 42, 43, and 44 contained in data row 40 are respectively data of distance measured by emitting light along optical paths 31, 32, 33, and 34.

Light emitted by range finding sensor 12 along optical paths 31 and 32 in FIG. 7 are not reflected in region 4 since objects, such as wall 2, are not present in region 4. Accordingly, range finding sensor 12 does not receive reflected light of light emitted along optical paths 31 and 32. As described above, range finding sensor 12 cannot acquire significant data of distance with respect to optical paths 31 and 32 and hence, data 41 and 42 show "nan", indicating no significant data of distance.

On the other hand, light outputted by range finding sensor 12 along optical paths 33 and 34 is reflected off wall 2 in region 4 so that the reflected light is received by range finding sensor 12. Range finding sensor 12 receives reflected light which moves along optical paths 33 and 34 in a direction opposite to the direction along which light is emitted. Accordingly, range finding sensor 12 acquires "17.01" and "12.36" as data of distances to objects present on the optical paths.

Processing performed by cleaning device 1 having the above-mentioned configuration is described hereinafter while specific examples of maps, movement path, and the like are shown.

Figure 9:
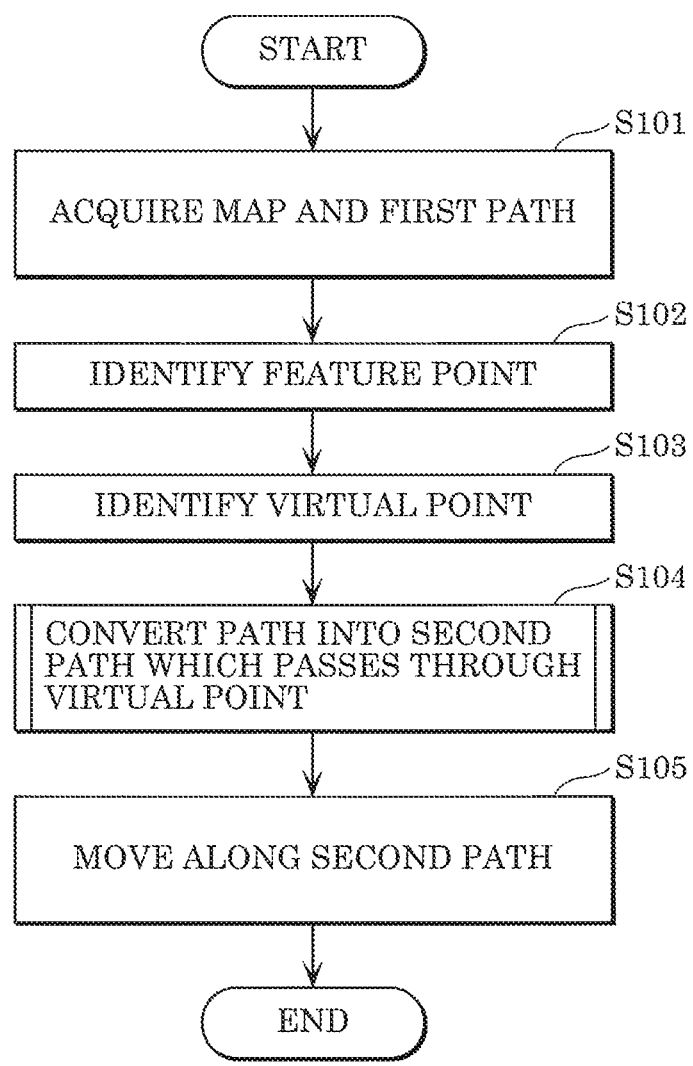
FIG. 9 is a flowchart showing a series of processing executed by the cleaning device according to Embodiment 1.

FIG. 9 is a flowchart showing a series of processing executed by cleaning device 1 of this embodiment.

In step S101, acquisition unit 21 acquires a map and a path (corresponding to the first path). Acquisition unit 21 may acquire a map and a path by reading out a map or a path stored in the memory device of cleaning device 1 in advance. With respect to a map, acquisition unit 21 may acquire the map by forming a map of a region where range finding is performable by range finding sensor 12 based on the results of the range finding performed by range finding sensor 12. Acquisition unit 21 may acquire the above-mentioned path such that a path is caused to extend in the current moving direction by a predetermined distance from the current position on the map of cleaning device 1, thus forming a path showing cleaning device 1 moving in the current moving direction of cleaning device 1 without any change.

In step S102, first identification unit 22 identifies feature points. To be more specific, first identification unit 22 identifies, as a feature point, a vertex on the borderline of the region where cleaning device 1 is capable of moving on the map. First identification unit 22 also identifies, as a feature point, a point closest to the first path, among points on a curved portion included in the borderline of the region where cleaning device 1 is capable of moving on the map.

In step S103, second identification unit 23 determines whether or not a virtual line segment which is set based on the feature point identified by first identification unit 22 in step S102 intersects with the first path. When the virtual line segment does not intersect with the first path, second identification unit 23 identifies a virtual point which is the point closest to the first path, among points on the above-mentioned virtual line segment. Detailed processing in step S103 is described later in detail.

In step S104, converter 24 converts the first path acquired in step S101 into a second path which passes through the virtual point identified in step S103. Detailed processing in step S104 is described later in detail.

In step S105, motor controller 25 causes motors 16 to drive along the second path converted by converter 24 in step S104, thus causing cleaning device 1 to move along the second path.

Respective processing executed by cleaning device 1 is described in detail hereinafter using specific examples of the map and the path.

Figure 10:
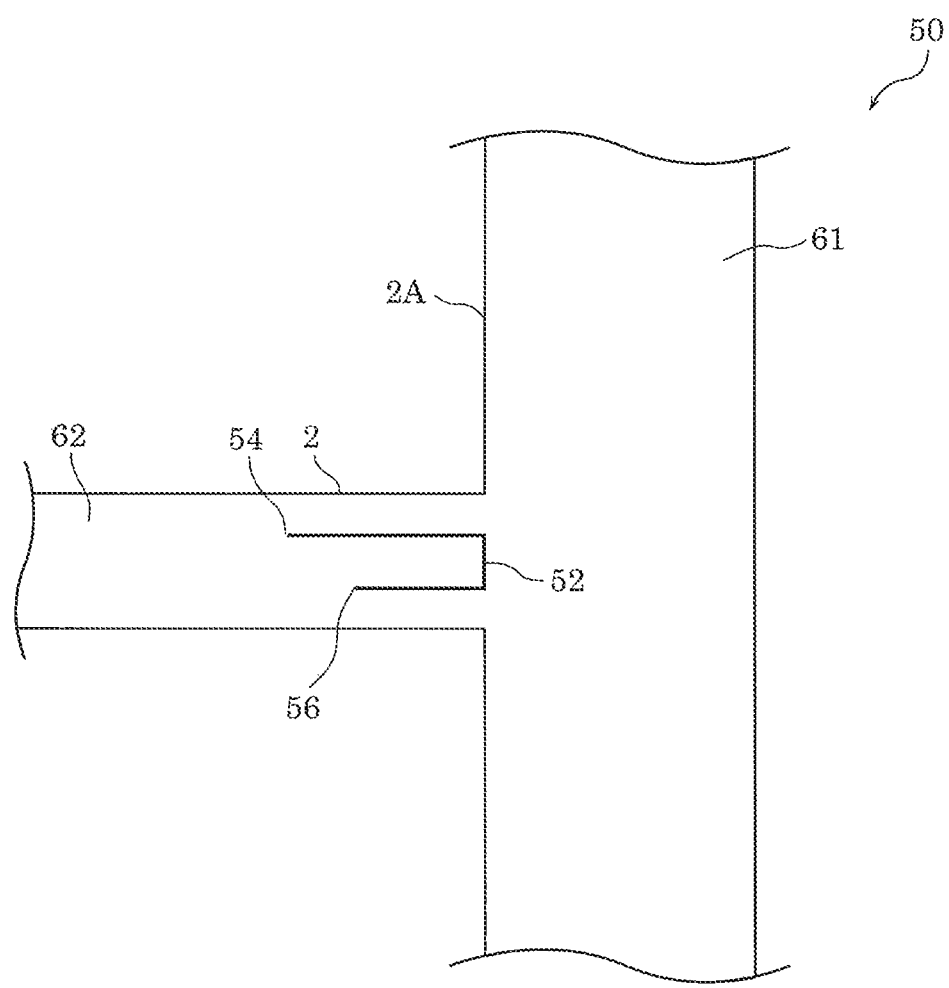
FIG. 10 is an explanatory view showing one example of a map and a path in Embodiment 1.
Figure 11:
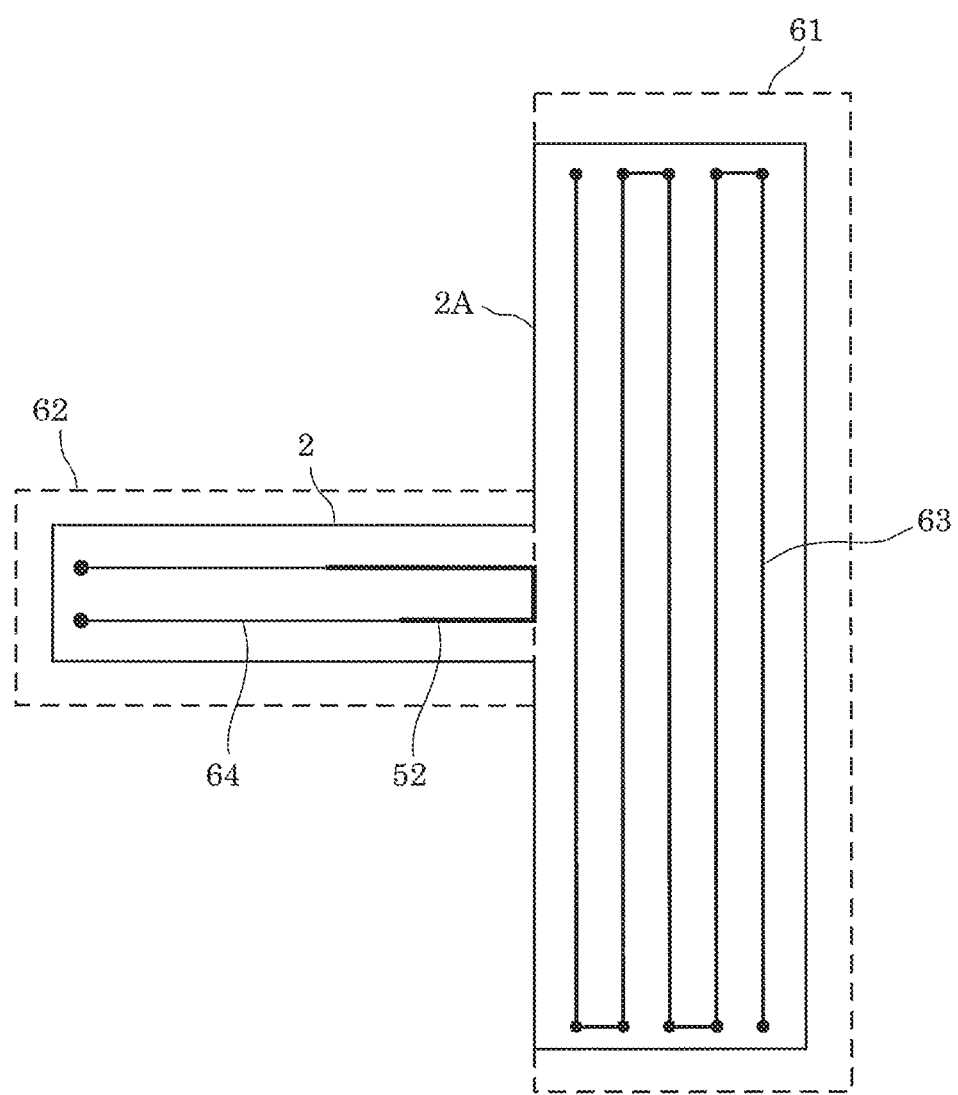
FIG. 11 is a second explanatory view showing one example of the map and the path in the embodiment.

FIG. 10 and FIG. 11 are explanatory views showing one example of map 50 and path 52 in this embodiment. Map 50 and path 52 are acquired by acquisition unit 21 in step S101.

As shown in FIG. 10, it is assumed that cleaning device 1 moves along path 52 starting from start point 54 to end point 56 on map 50. For example, path 52 is a portion of a path along which cleaning device 1 is assumed to move in the case where cleaning device 1 thoroughly cleans passage 61 and passage 62 shown in FIG. 11. Cleaning device 1 first moves along path 63 where cleaning device 1 moves back and forth in passage 61 parallel to wall 2A. Thereafter, cleaning device 1 moves along path 64 where cleaning device 1 moves back and forth in passage 62 parallel to wall 2. When cleaning device 1 moves in passage 62, cleaning device 1 does not enter passage 61. This is because if a place which is cleaned once is cleaned again, a large amount of time is required, thus deteriorating efficiency. Path 52 in FIG. 10 corresponds to a portion of path 64 extracted.

Figure 12A:
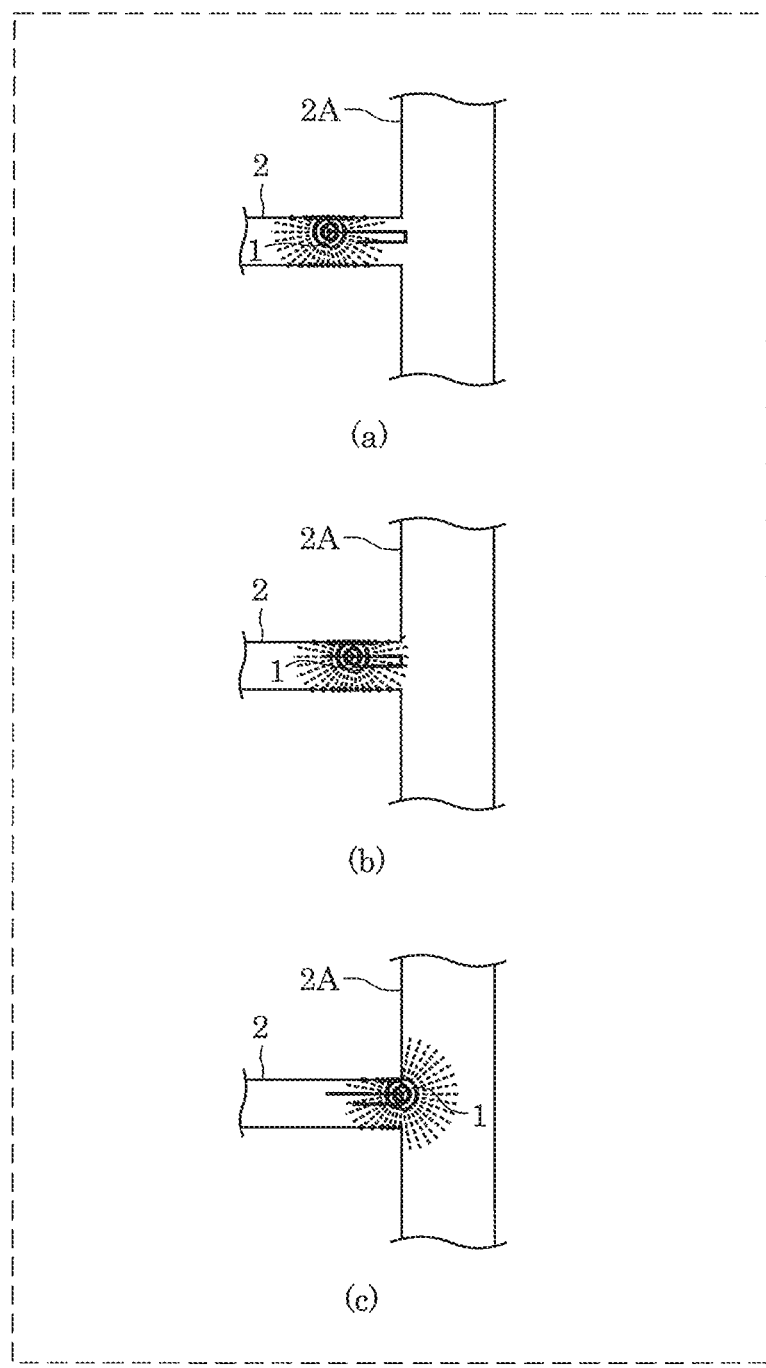
FIG. 12A is a first explanatory view showing range finding performed when the cleaning device moves along a movement path.
Figure 12B:
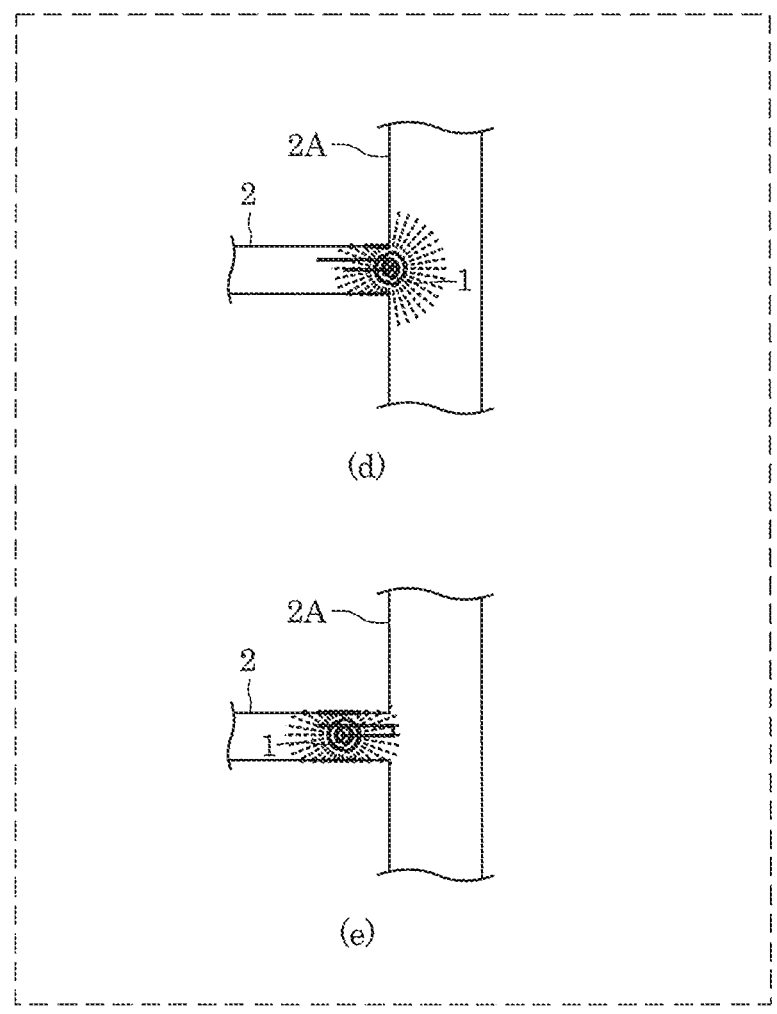
FIG. 12B is a second explanatory view showing range finding performed when the cleaning device moves along the movement path.

FIG. 12A and FIG. 12B are explanatory views showing range finding performed when cleaning device 1 moves along the movement path. FIG. 12A and FIG. 12B show, with black dots, objects on which range finding can be performed by range finding sensor 12 during the following movement of cleaning device 1. The movement starts from a state where cleaning device 1 is positioned at start point 54 ((a) in FIG. 12A). Then, cleaning device 1 moves along path 52 ((b) and (c) in FIG. 12A, (d) in FIG. 12B), thus finally reaching a state where cleaning device 1 is positioned at end point 56 ((e) in FIG. 12B).

Objects on which range finding can be performed by range finding sensor 12 during the movement shown in FIG. 12A and FIG. 12B are only points on walls 2 which are parallel to each other. Range finding cannot be performed on objects other than the points on walls 2, for example, on wall 2A. Accordingly, cleaning device 1 cannot appropriately perform self-position estimation when cleaning device 1 moves along path 52.

Figure 13:
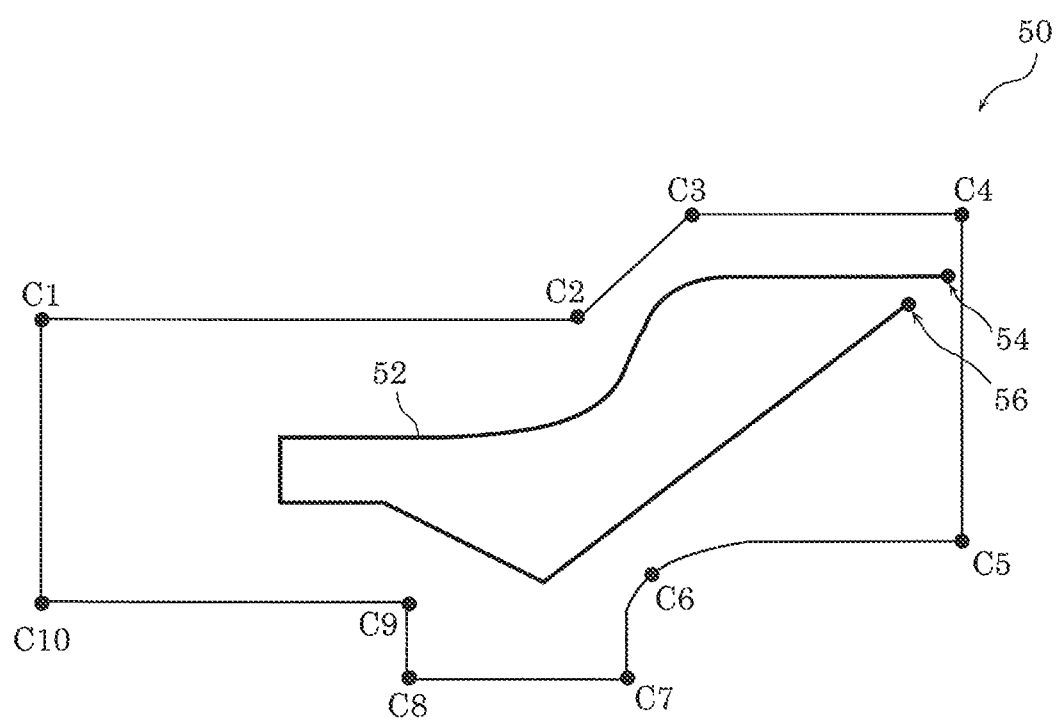
FIG. 13 is a third explanatory view showing one example of a map and a path in the embodiment.

Hereinafter, for the purpose of convenience of the description, the description is made by taking, as an example, the case where acquisition unit 21 acquires map 50 and path 52 shown in FIG. 13 in step S101. Points identified by first identification unit 22 in step S102 are indicated by point Ci ($1 \leq i \leq 10$) on map 50.

Figure 14:
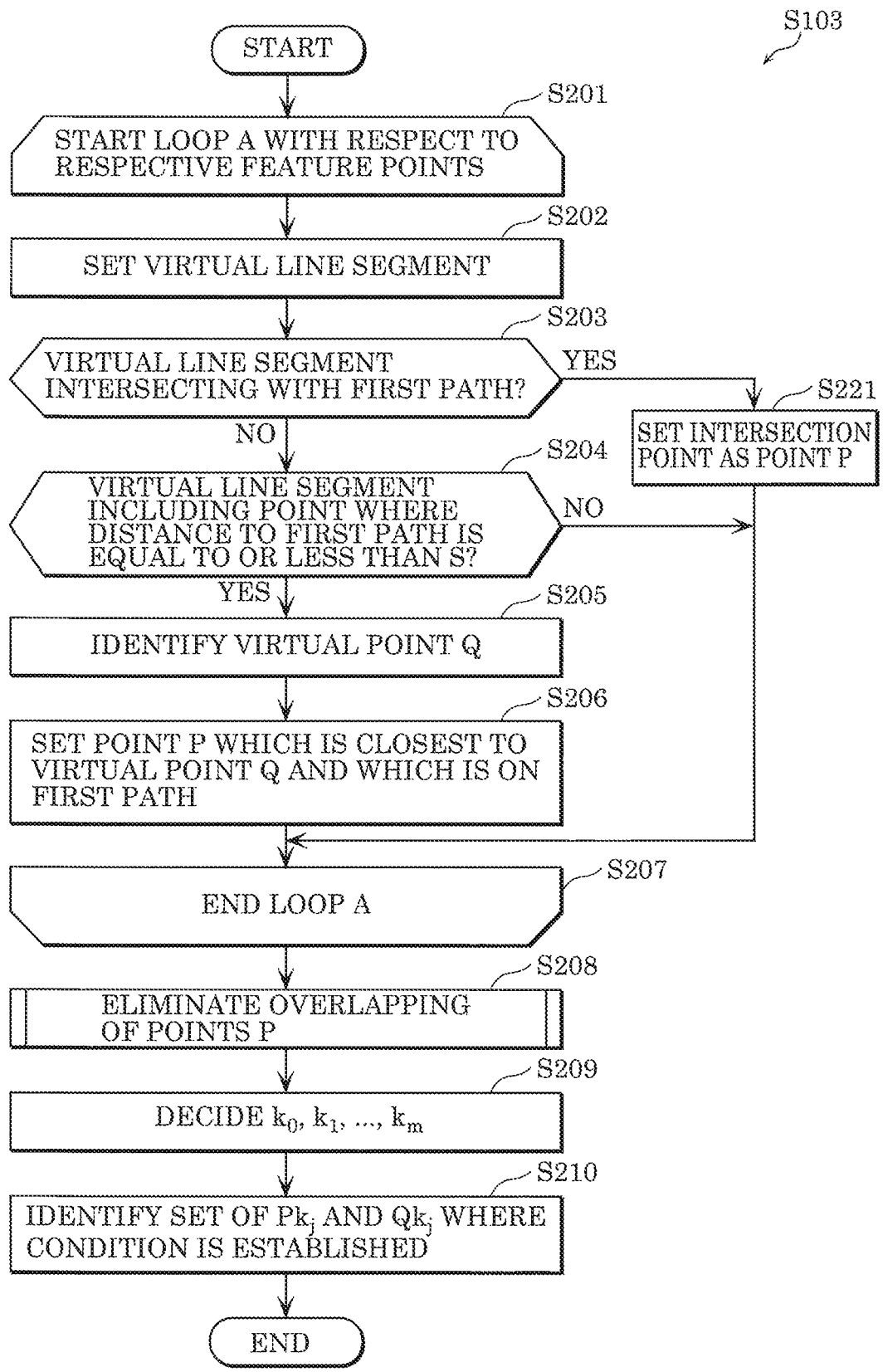
FIG. 14 is a flowchart showing processing of identifying a virtual point by a second identification unit in the embodiment.
Figure 15:
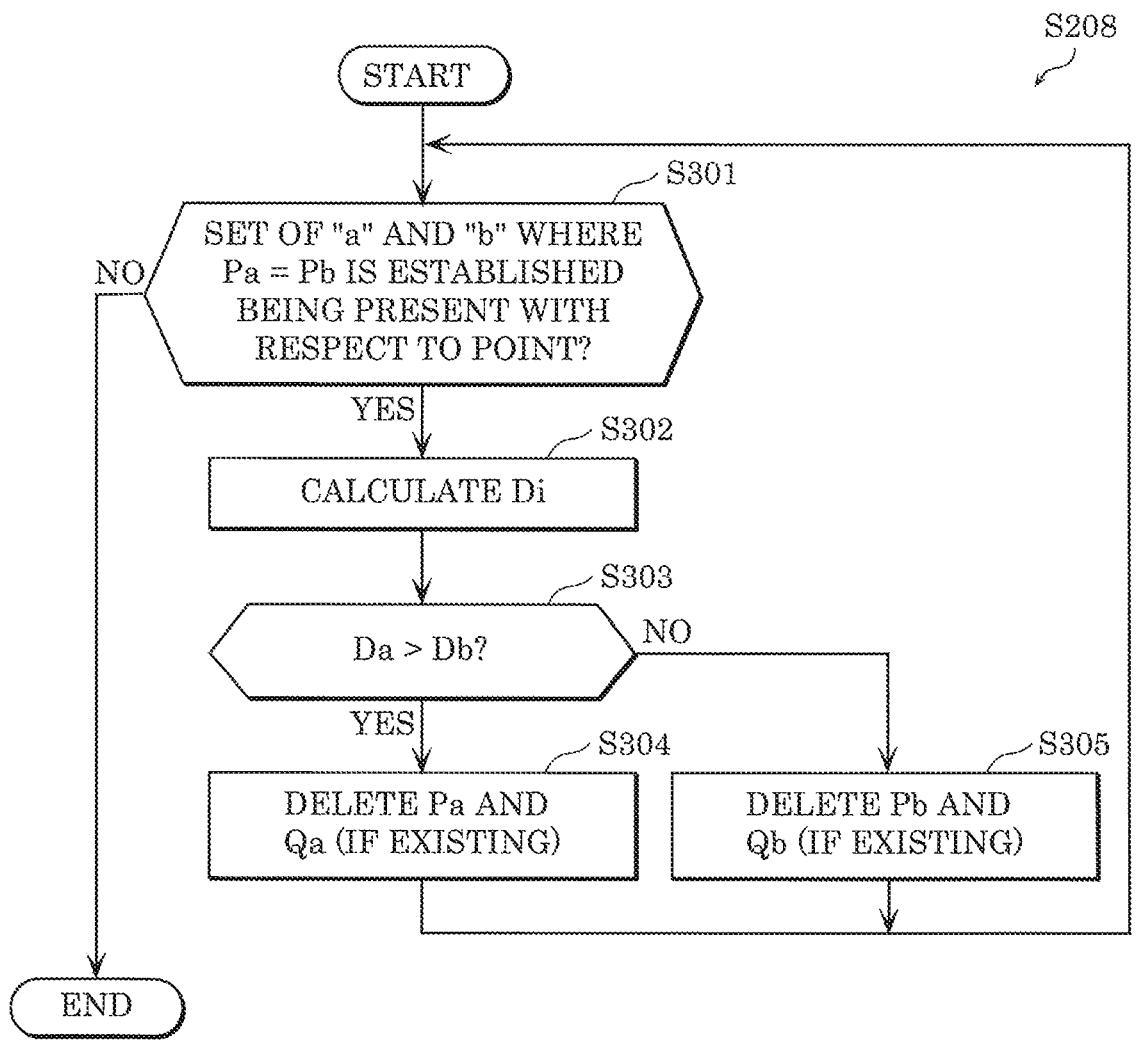
FIG. 15 is a flowchart showing processing of eliminating overlapping of virtual points by the second identification unit in the embodiment.
Figure 16:
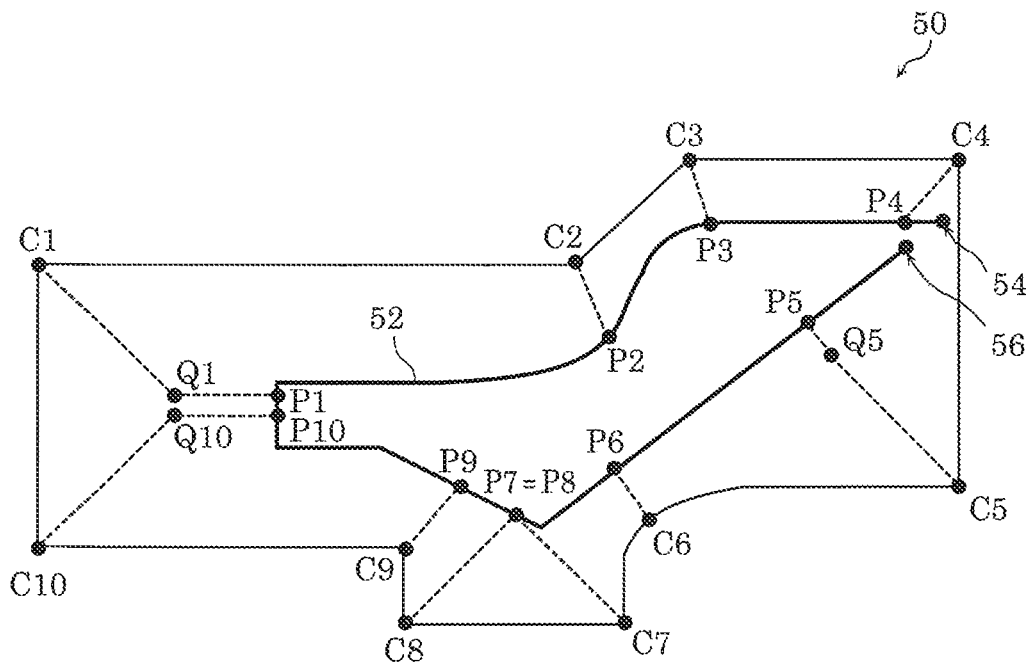
FIG. 16 is a first explanatory view showing identification of feature points and virtual points in the embodiment.
Figure 17:
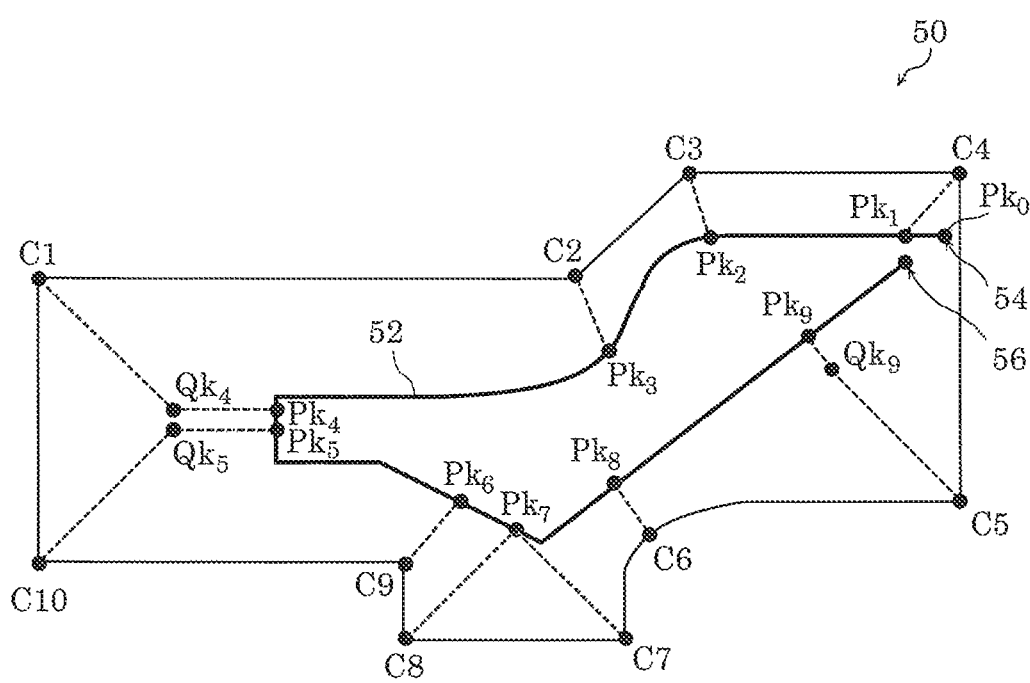
FIG. 17 is a second explanatory view showing identification of feature points and virtual points in the embodiment.

FIG. 14 is a flowchart showing processing of identifying virtual points by second identification unit 23 in this embodiment. FIG. 15 is a flowchart showing processing of eliminating overlapping of virtual points by second identification unit 23 in this embodiment. FIG. 16 and FIG. 17 are explanatory views showing identification of feature points and virtual points in this embodiment.

A series of processing shown in FIG. 14 shows processing performed in step S103 shown in FIG. 9 in detail.

In step S201, second identification unit 23 performs processing of starting loop A where processing in step S202 to step S206 described later is repeatedly executed. In loop A, processing is executed by focusing on one of the plurality of feature points Ci identified in step S102, and eventually processing is executed on each of feature points Ci. A focused feature point is indicated by feature point C.

In step S202, second identification unit 23 sets a virtual line segment. The virtual line segment is set as a line segment which extends toward the first path from feature point C with a length at which range finding can be performed by range finding sensor 12. When focused feature point C is a vertex on the borderline of the region where cleaning device 1 is capable of moving, second identification unit 23 sets the above-mentioned virtual line segment on a bisector which bisects an angle formed by the borderlines at the vertex. When focused feature point C is a point on a curved portion included in the borderline of the region where cleaning device 1 is capable of moving, second identification unit 23 sets the virtual line segment on a straight line which passes through a point closest to the first path, among points on the curved line, and which perpendicularly intersects with the first path.

In step S203, second identification unit 23 determines whether or not the virtual line segment set in step S202 intersects with the first path. When the virtual line segment intersects with the first path (Yes in step S203), the processing advances to step S221. On the other hand, when the virtual line segment does not intersect with the first path (No in step S203), the processing advances to step S204.

In step S204, second identification unit 23 determines whether or not there is present, among points on the virtual line segment, a point where the distance between the point and the feature point is equal to or less than a predetermined distance S. When the above-mentioned point is present (Yes in step S204), the processing advances to step S205. On the other hand, when the above-mentioned point is not present (No in step S204), the processing advances to step S207.

In step S205, second identification unit 23 identifies, as virtual point Q, a point, among points on the virtual line segment, where a distance between the point and the feature point is equal to or less than predetermined distance S, and has the shortest distance. Virtual point Q which is to be identified is a point where self-position estimation can be performed by cleaning device 1 in the vicinity of virtual point Q. Virtual point Q may also be indicated by virtual point Qi by adding a suffix "i" of feature point Ci, being currently focused feature point C.

In step S206, second identification unit 23 sets a point on the first path closest to virtual point Q as point P. In other words, in the case where the first path is formed of a line obtained by connecting the plurality of points, point P is a point closest to virtual point Q among a plurality of points included in the first path. Point P which is to be set may form a branch point of a path extending toward virtual point Q from the first path. Point P may also be indicated by point Pi by adding a suffix "i" of focused feature point Ci, being currently focused feature point C.

In step S221, second identification unit 23 sets, as point P, a point where the virtual line segment set in step S202 and the first path intersect with each other. Point P which is to be set is a point where self-position estimation can be performed by cleaning device 1 in the vicinity of point P.

In step S207, second identification unit 23 performs end processing of loop A. To be more specific, second identification unit 23 determines whether or not processing in step S202 to step S206 is performed on all of the plurality of feature points Ci identified in step S102. When processing in step S202 to step S206 is not yet performed on all of the plurality of feature points Ci identified in step S102, control is performed so as to perform processing in step S202 to step S206 on feature points on which processing is not yet performed. FIG. 16 shows, on map 50 shown in FIG. 13, virtual points Q1, Q5, and Q10 identified at a point when step S207 is finished, and points P1 to P10.

In step S208, second identification unit 23 performs processing of eliminating overlapping of the plurality of points P identified in step S206 and step S221 in the case where there is overlapping. This processing is described later in detail.

In step S209, second identification unit 23 decides $k_0, k_1, \ldots, k_m$ such that cleaning device 1 passes through $Pk_0, Pk_1, \ldots, Pk_m$ in this order when cleaning device 1 moves along the first path. In this embodiment, assume that $Pk_0$ is start point 54. FIG. 17 shows, on map 50 shown in FIG. 16, virtual points $Qk_4$, $Qk_5$, and $Qk_9$ identified at a point when step S209 is finished, and points $Pk_0$ to $Pk_9$.

In step S210, second identification unit 23 identifies a set of $Pk_j$ and $Qk_j$ where the condition shown by the following (formula 1) is established.

$$\|Qk_j - Pk_j\| < \|Pk_j - Pk_{(j-1)}\|$$ (formula 1)

To be more specific, when "j" is 4 or 9 (j=4 or 9), (formula 1) is established. On the other hand, when "j" is 5 (j=5), (formula 1) is not established. Accordingly, second identification unit 23 identifies a set of $Pk_4$ and $Qk_4$, and a set of $Pk_9$ and $Qk_9$ as points where a converted path is required to pass. If a path is converted to pass through all virtual points $Qk_j$ identified in step S205, an error in self-positioning, which is caused when cleaning device 1 returns to the first path from virtual point $Qk_j$, increases. Accordingly, there may be a case where the degree of error in self-positioning is smaller when cleaning device 1 does not pass through virtual point $Qk_j$. In view of the above, second identification unit 23 compares the length of a path from virtual point $Qk_j$ to point $Pk_j$, forming the branch point, in the case where the path is changed to pass through virtual point $Qk_j$; (that is, left side of (formula 1)) and the length of a path to point $Pk_j$ from point $Pk_{(j-1)}$ which is a point where self-position estimation is performed before cleaning device 1 is positioned at point $Pk_j$ or, which is a point where the path is branched for performing self-position estimation (that is, right side of (formula 1)). When the value of the left side of (formula 1) is lesser than the value of the right side of (formula 1), the path is converted to a path which passes through virtual point $Qk_j$. On the other hand, when the value of the left side of (formula 1) is equal to or greater than the value of the right side of (formula 1), the above-mentioned conversion is prohibited.

Figure 18:
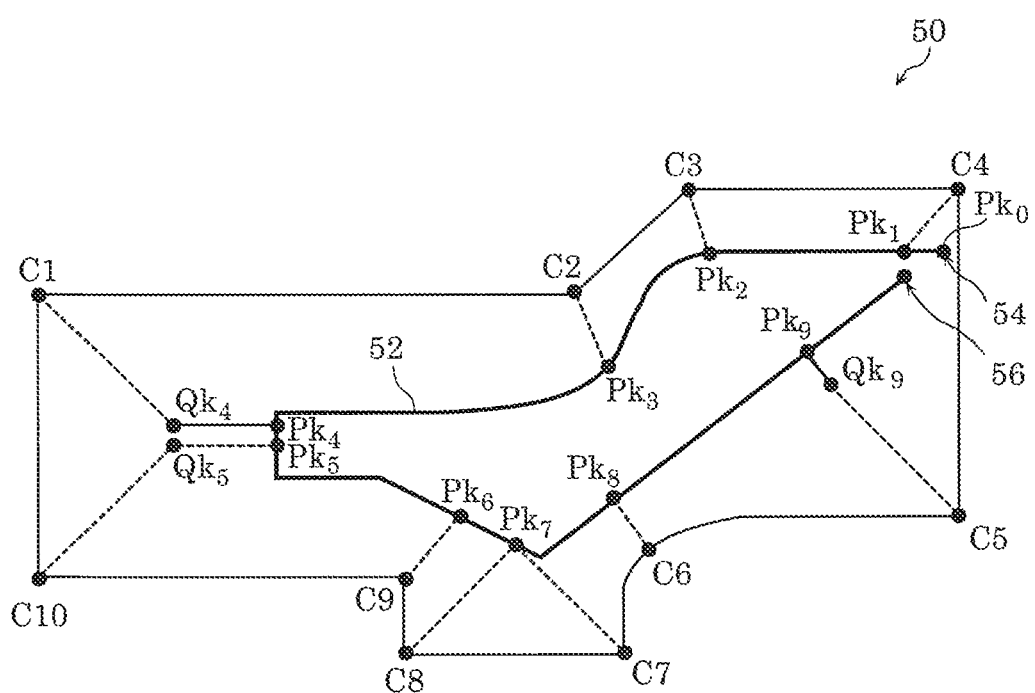
FIG. 18 is an explanatory view showing the first example of a path converted by a converter in the embodiment.

With processing in the above-mentioned step S210, a distance from point $Pk_4$ (corresponding to the third point) closest to virtual point $Qk_4$ (corresponding to the first point) in path 52 to point $Pk_5$ (corresponding to the fourth point) closest to virtual point $Qk_5$ (corresponding to the second point) in path 52 is equal to or less than a distance from virtual point $Qk_5$ to point $Pk_5$. Accordingly, converter 24 prohibits the conversion of path 52 to a path which passes through virtual point $Qk_5$. The path shown in FIG. 18 is generated as described above.

When step S210 is finished, a series of processing shown in FIG. 14 is finished.

Next, processing in the above-mentioned step S208 is described in detail with reference to FIG. 15.

In step S301, second identification unit 23 determines whether or not the set of "a" and "b" where Pa=Pb is established is present with respect to point Pi (1≤i≤m). When the set of "a" and "b" where Pa=Pb is established is present (Yes in step S301), the processing advances to step S302. On the other hand, when the set of "a" and "b" where Pa=Pb is established is not present (No in step S301), a series of processing shown in FIG. 15 is finished.

In step S302, second identification unit 23 calculates "Di" by the following (formula 2).

$$Di = \|Qi - Pi\| \text{ (in the case where } Qi \text{ is present)}$$

$$Di = 0 \text{ (in the case where } Qi \text{ is } not \text{ present)} \quad \text{(formula 2)}$$

In step S303, second identification unit 23 determines whether or not Da is greater than Db. When Da is greater than Db (Yes in step S303), the processing advances to step S304. On the other hand, when Da is not greater than Db (No in step S303), the processing advances to step S305.

In step S304, second identification unit 23 deletes Pa and Qa (if existing).

In step S305, second identification unit 23 deletes Pb and Qb (if existing).

When step S304 or S305 is finished, a series of processing shown in FIG. 15 is finished.

With the above-mentioned series of processing, P7=P8 (that is, a=7, b=8) is established, and D7=D8=0 is established and hence, P8 is deleted in step S305 (see FIG. 16).

With a series of processing described above, virtual point Qi is identified and, further, branch point Pi is identified from which a path is branched to a path leading to virtual point Qi. Using virtual point Qi and branch point Pi which are identified as described above, in step S104, a path where cleaning device 1 moves back and forth between branch point Pi and virtual point Qi is added to the first path, thus converting the first path into the second path.

FIG. 18 specifically shows virtual points Q and points P identified at a point when step S210 is finished. FIG. 18 also shows a path converted by converter 24 using virtual points Q and points P identified in step S210. In this embodiment, the converted path includes a path where cleaning device 1 moves back and forth between $Pk_4$ and $Qk_4$, and a path where cleaning device 1 moves back and forth between $Pk_9$ and $Qk_9$. However, the converted path does not include a path where cleaning device 1 moves back and forth between $Pk_4$ and $Qk_4$.

Figure 19A:
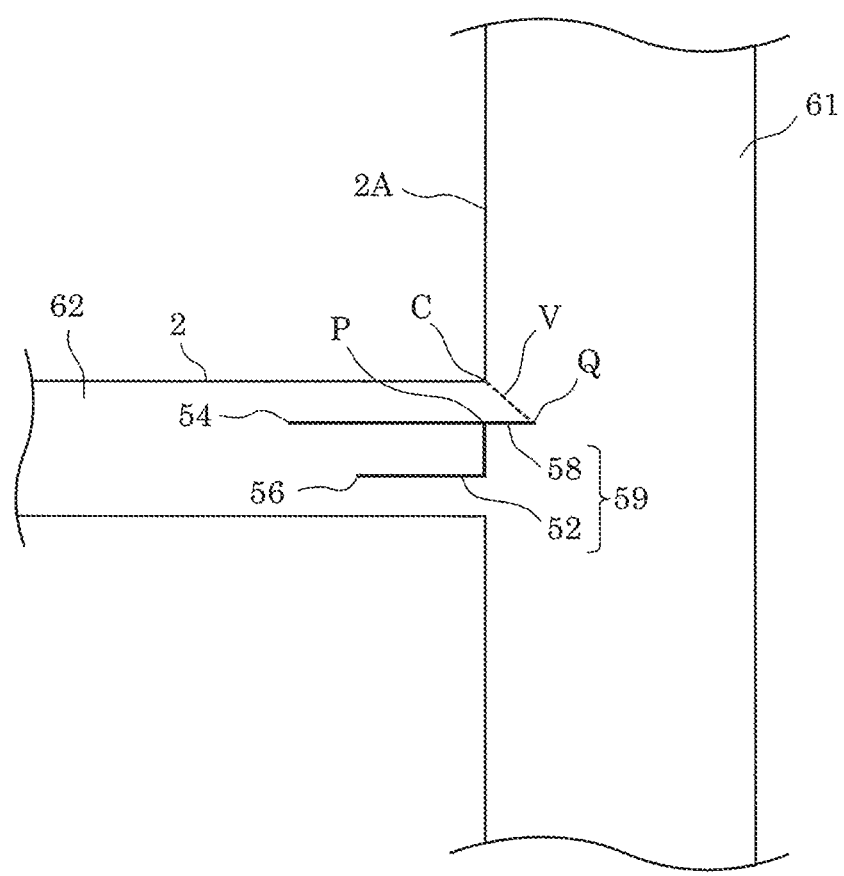
FIG. 19A is a first explanatory view showing the second example of a path converted by the converter in the embodiment.
Figure 19B:
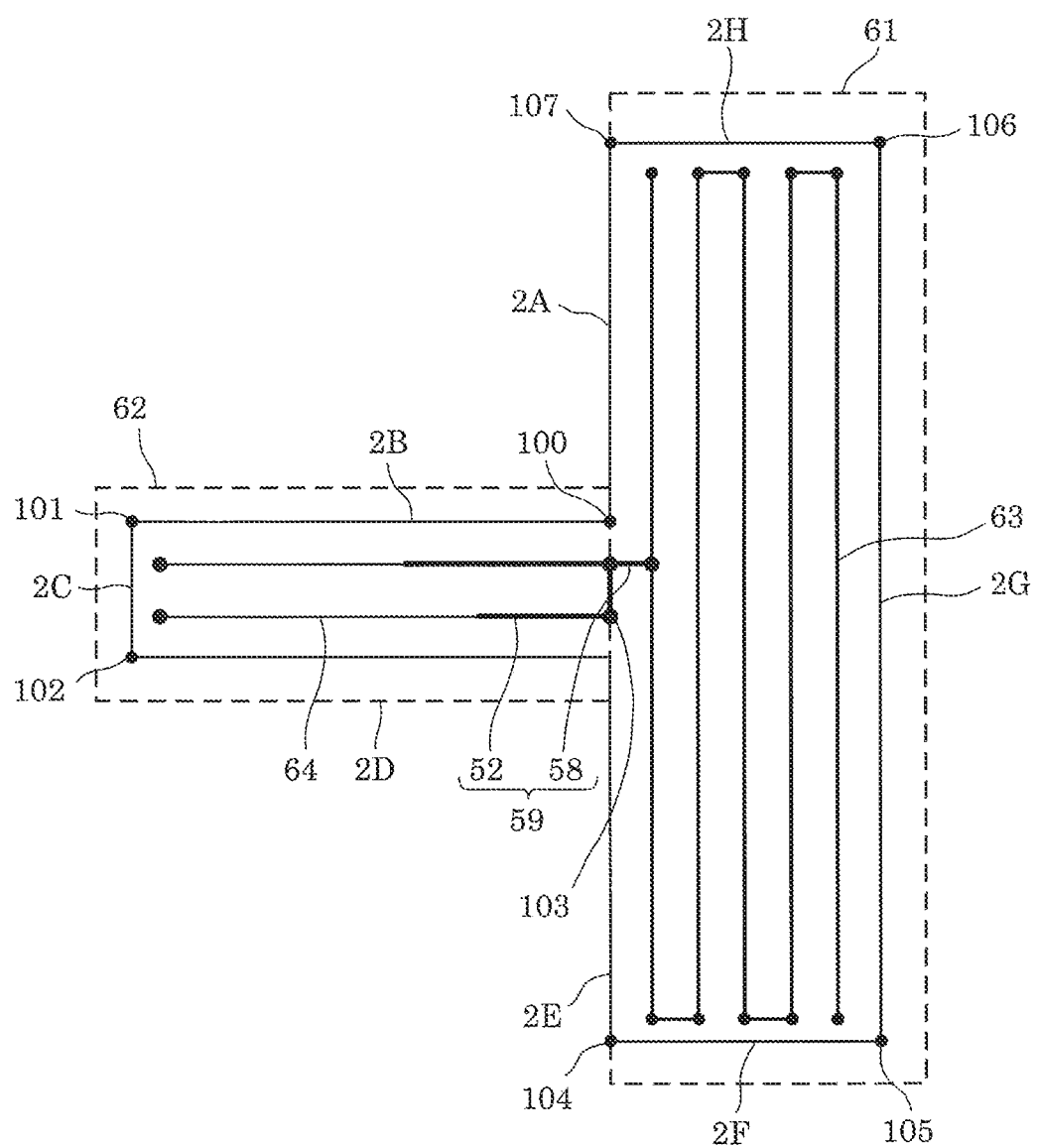
FIG. 19B is a second explanatory view showing the second example of the path converted by the converter in the embodiment.

FIG. 19A and FIG. 19B are explanatory views showing the second example of the converted path in this embodiment.

Path 59 shown in FIG. 19A is one example of a path obtained by converting path 52 shown in FIG. 10.

To be more specific, path 59 is obtained by adding path 58 to path 52. To be more specific, first identification unit 22 identifies feature point C with respect to path 52. Second identification unit 23 identifies virtual line segment V and virtual point Q. Then, converter 24 adds, to path 52, path 58 where cleaning device 1 moves back and forth between point P on path 52 and virtual point Q. With such operations, path 59 can be acquired.

Figure 20A:
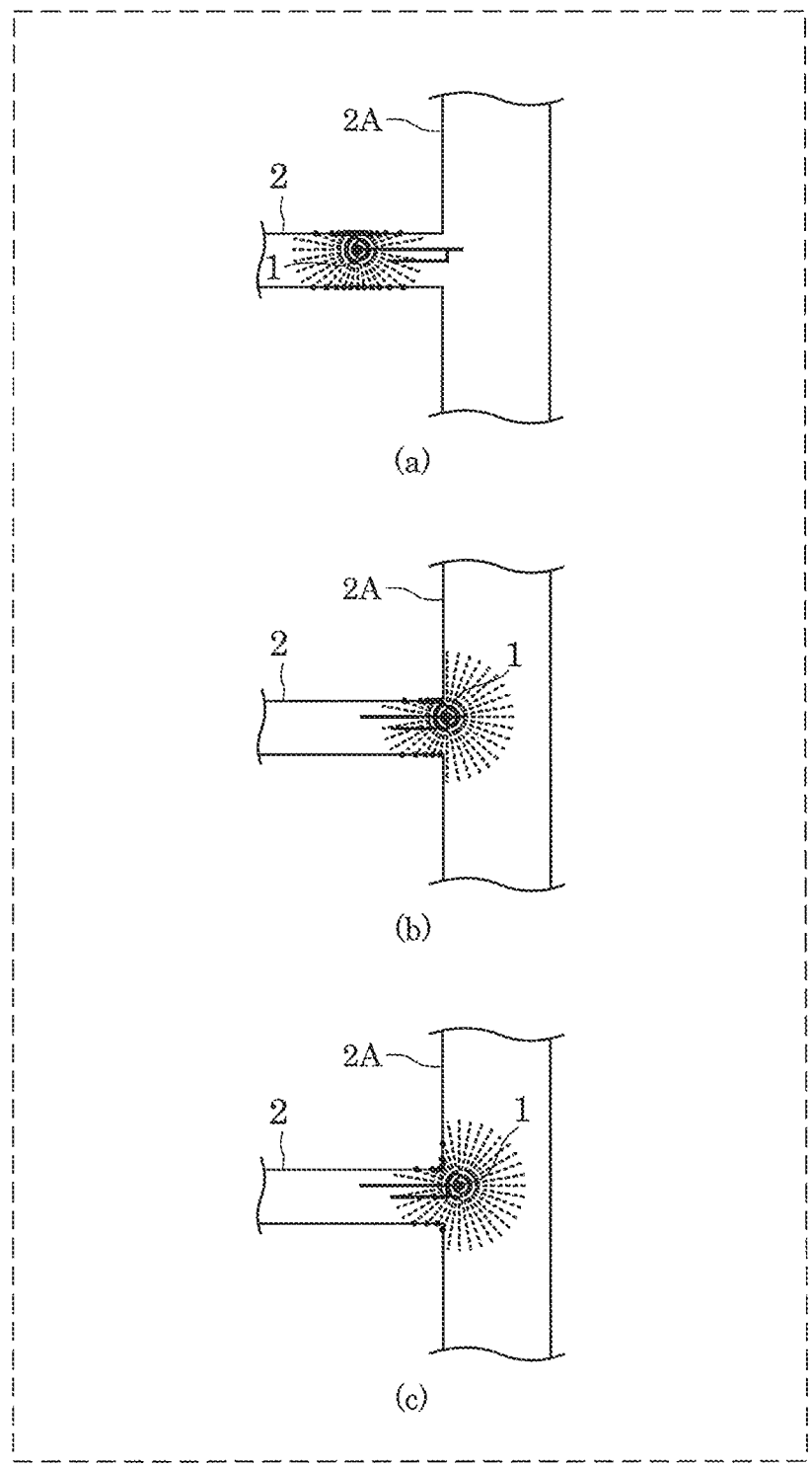
FIG. 20A is a first explanatory view showing range finding performed when the cleaning device according to the embodiment moves along the converted path.
Figure 20B:
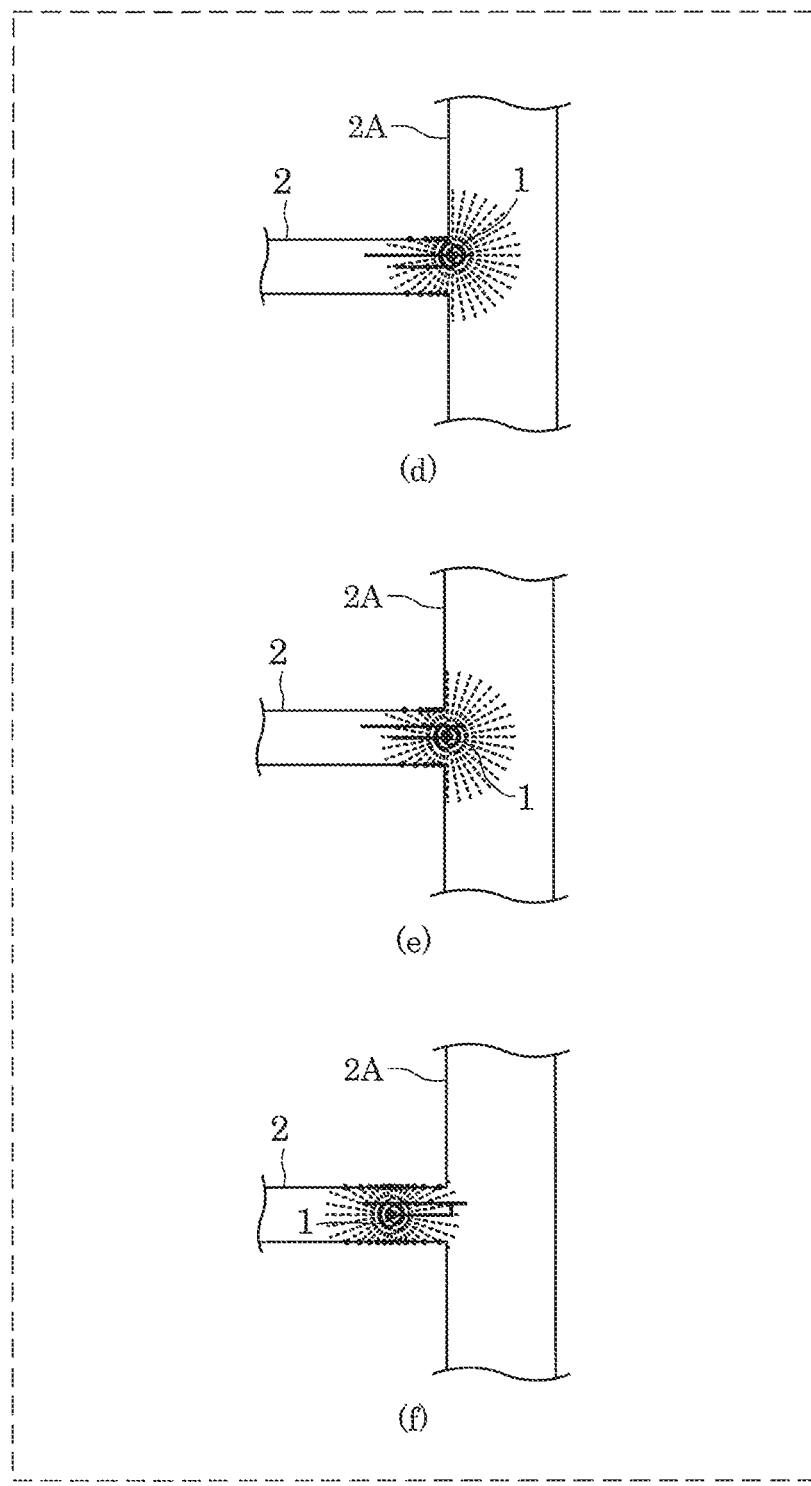
FIG. 20B is a second explanatory view showing range finding performed when the cleaning device according to the embodiment moves along the converted path.

FIG. 20A and FIG. 20B are explanatory views showing objects on which range finding can be performed when cleaning device 1 according to this embodiment moves along converted path 59. FIG. 20A and FIG. 20B show, with black dots, objects on which range finding can be performed by range finding sensor 12 during the following movement of cleaning device 1. The movement starts from a state where cleaning device 1 is positioned at start point 54 ((a) in FIG. 20A). Then, cleaning device 1 moves along path 52 ((b) in FIG. 20A), and further moves back and forth along path 58 ((c) in FIG. 20A). Thereafter, cleaning device 1 moves along path 52 ((d) and (e) in FIG. 20B), thus finally reaching a state where cleaning device 1 is positioned at end point 56 ((f) in FIG. 20B).

Objects on which range finding can be performed by range finding sensor 12 during this movement include not only points on walls 2 which are parallel to each other in passage 62, but also wall 2A in passage 61. To be more specific, when cleaning device 1 is at a position shown in (c) in FIG. 20A, range finding sensor 12 can detect both points on walls 2 and points on wall 2A. Accordingly, cleaning device 1 can appropriately perform self-position estimation when cleaning device 1 moves along path 59.

The description is made below with respect to examples where the conversion of a path of cleaning device 1 according to this embodiment is applied to another path.

Figure 21:
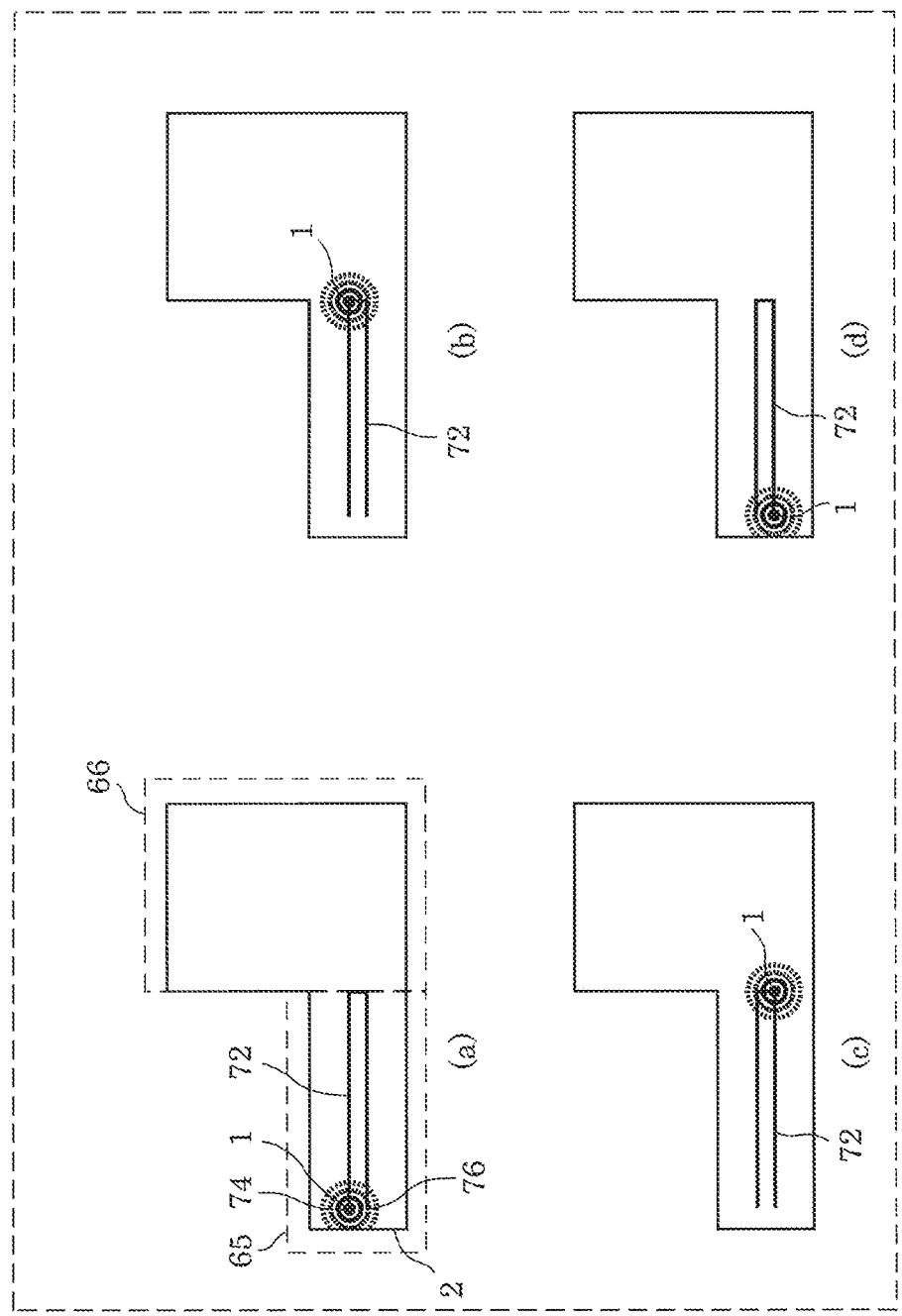
FIG. 21 is a fourth explanatory view showing a map and a path in the embodiment.

FIG. 21 is a fourth explanatory view showing a map and a path in this embodiment. FIG. 21 also shows objects on which range finding can be performed when cleaning device 1 moves along the movement path. To be more specific, FIG. 21 shows, with black dots, objects on which range finding can be performed by range finding sensor 12 during the following movement of cleaning device 1. The movement starts from a state where cleaning device 1 is positioned at start point 74 ((a) in FIG. 21). Then, cleaning device 1 moves along path 72 ((b) and (c) in FIG. 21), thus finally reaching a state where cleaning device 1 is positioned at end point 76 ((d) in FIG. 21).

In this example, objects on which range finding can be performed by range finding sensor 12 during this movement are only points on walls 2 in passage 65. Accordingly, cleaning device 1 cannot appropriately perform self-position estimation when cleaning device 1 moves along the first path.

Figure 22A:
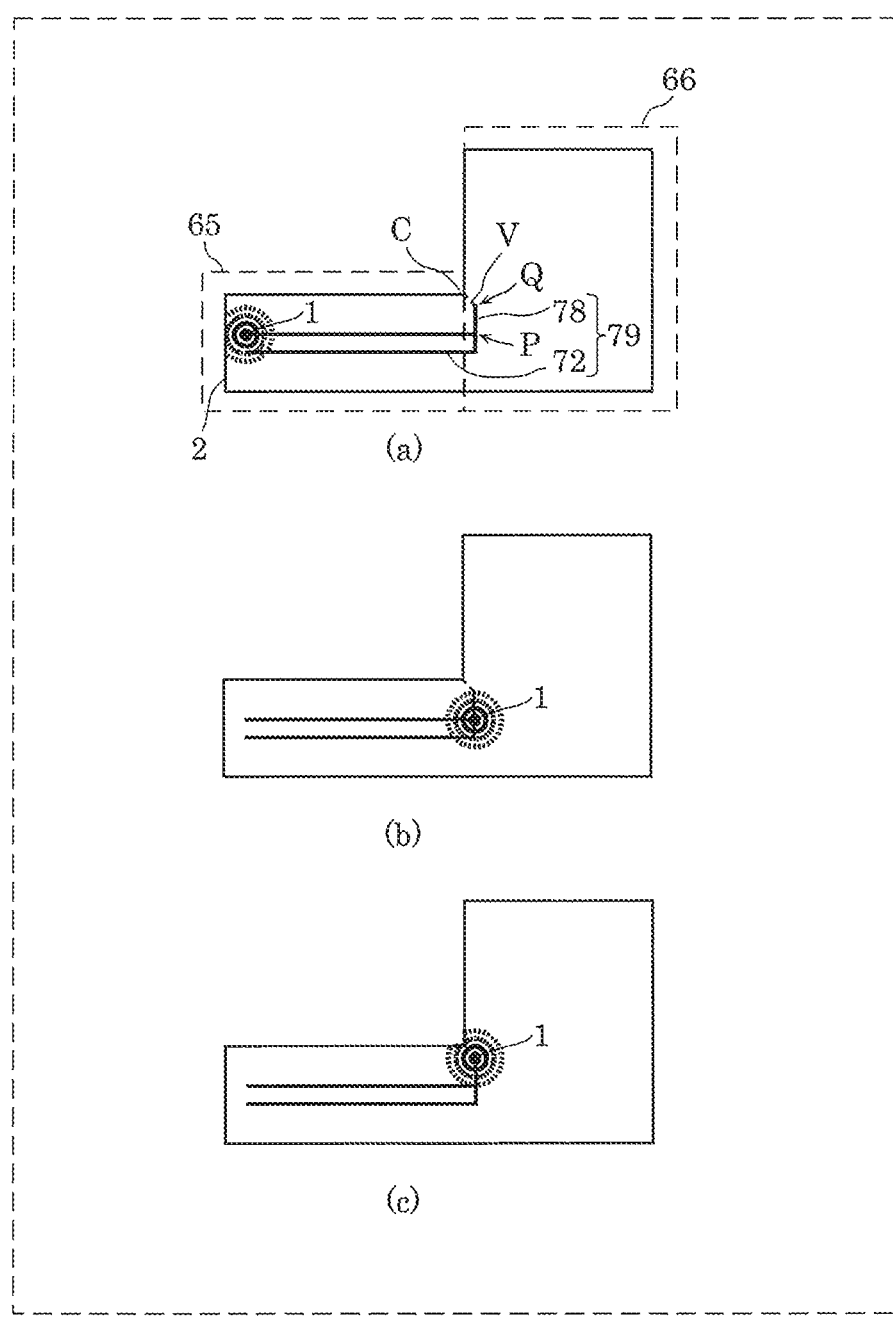
FIG. 22A is a third explanatory view showing range finding performed when the cleaning device according to the embodiment moves along the converted path.
Figure 22B:
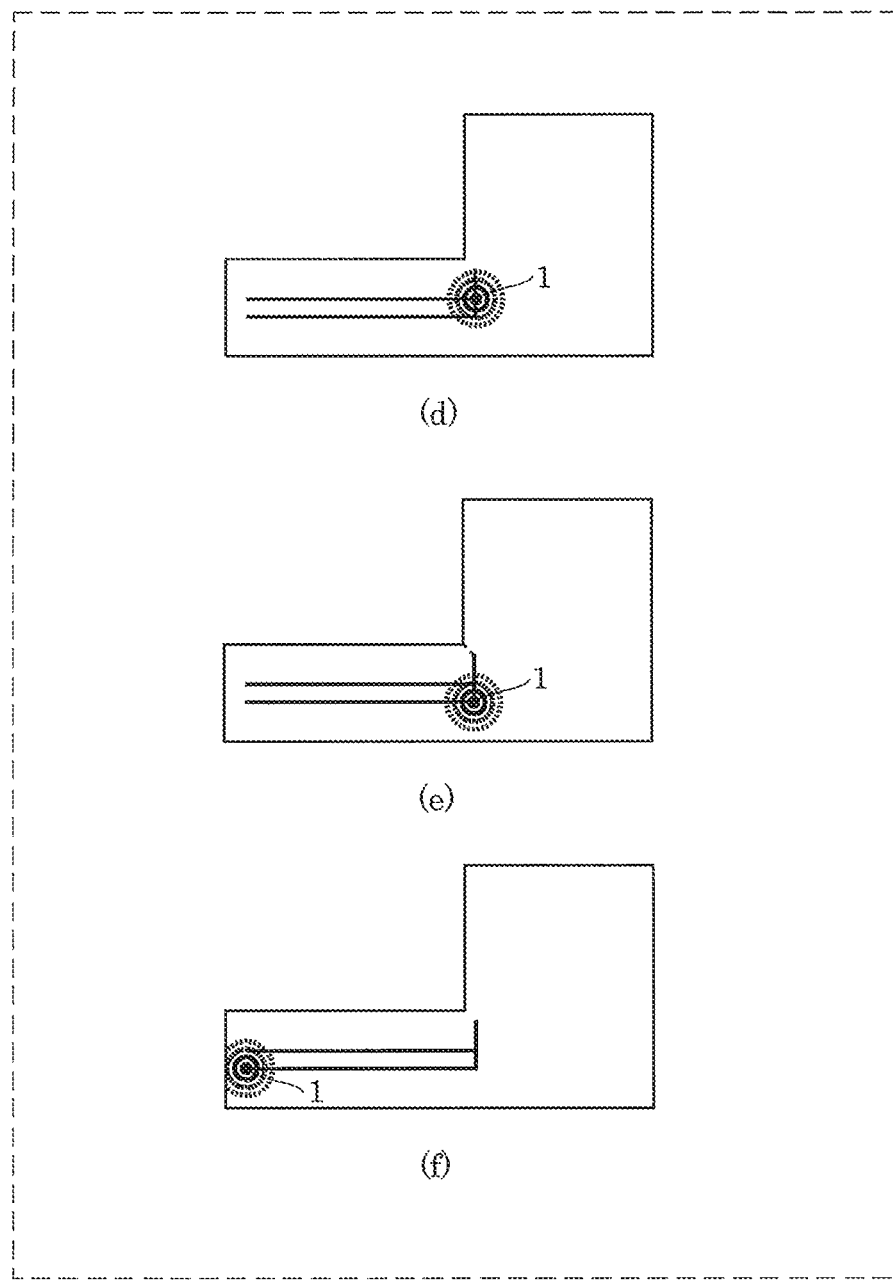
FIG. 22B is a fourth explanatory view showing range finding performed when the cleaning device according to the embodiment moves along the converted path.

FIG. 22A and FIG. 22B are explanatory views showing the second example of the converted movement path in this embodiment. FIG. 22A and FIG. 22B also show objects on which range finding can be performed when cleaning device 1 moves along the converted movement path. FIG. 22A and FIG. 22B show, with black dots, objects on which range finding can be performed by range finding sensor 12 during the following movement of cleaning device 1. The movement starts from a state where cleaning device 1 is positioned at start point 74 ((a) in FIG. 22A). Then, cleaning device 1 moves along path 72 ((b) in FIG. 22A), and further moves back and forth along path 78 ((c) in FIG. 22A). Thereafter, cleaning device 1 moves along path 72 ((d) and (e) in FIG. 22B), thus finally reaching a state where cleaning device 1 is positioned at end point 76 ((f in FIG. 22B).

Objects on which range finding can be performed by range finding sensor 12 during this movement include not only points on walls 2 in passage 65, but also wall 2A in passage 66. To be more specific, when cleaning device 1 is at a position shown in (c) in FIG. 22A, range finding sensor 12 can detect both points on walls 2 and points on wall 2A. Accordingly, cleaning device 1 can appropriately perform self-position estimation when cleaning device 1 moves along path 79.

The mobile robot of this embodiment can also be expressed as follows.

That is, the mobile robot of this embodiment includes range finding sensor 12 having a predetermined range-finding range, and acquisition unit 21 which acquires a map of an environment, the map including position information of objects, and the first path along which the mobile robot is to move in the environment.

The above-mentioned environment includes at least a first region and a second region, and the environment is formed of a plurality of corners and a plurality of wall surfaces which surround the environment. Further, a first corner of the plurality of corners is in contact with the first region and the second region. For example, in the case of the housing environment, the environment includes a region which includes a living room, a kitchen, an entrance, bedrooms, and corridors which connect these rooms. In the case of an environment in a commercial building or an office building, the environment includes a region which includes shop sections, office sections, corridors, and an elevator hall. Each region shown in FIG. 19A and FIG. 19B is defined to have a rectangular shape. The mobile robot moves to satisfy at least either one of first movement or second movement. In this embodiment, the first movement is as follows. The mobile robot enters the second region from the first region. Thereafter, the mobile robot moves such that one of the plurality of wall surfaces defining the second region is positioned within the above-mentioned range-finding range. Then, the mobile robot moves to the first region from the second region. Further, the second movement is as follows. The mobile robot enters the first region from the second region. Thereafter, the mobile robot moves such that one of the plurality of wall surfaces defining the first region is positioned within the above-mentioned range-finding range. Then, the mobile robot moves to the second region from the first region.

FIG. 19B shows one example of a path in the case where cleaning device 1 thoroughly moves in the region of passage 61 and the region of passage 62. In this embodiment, it is also possible to express that the environment shown in FIG. 19B includes the first region, which corresponds to passage 61, and the second region, which corresponds to passage 62. The environment shown in FIG. 19B also includes a plurality of corners which correspond to points 100, 101, 102, 103, 104, 105, 106, 107. In other words, passage 62 is a region surrounded by points 100, 101, 102, 103, and walls 2B, 2C, 2D shown in FIG. 19B. Passage 61 is a region surrounded by points 100, 103, 104, 105, 106, 107, and walls 2A, 2E, 2F, 2G, 2H shown in FIG. 19B. The border between passage 61 and passage 62 is formed by points 100 and 103 and a straight line which connects point 100 and point 103 with each other. This straight line is also referred to as a border line. Points 100, 103 of the plurality of points are in contact with both passage 61 and passage 62.

In FIG. 19B, in the same manner as FIG. 11, cleaning device 1 moves along path 63 where cleaning device 1 moves back and forth in passage 61 parallel to wall 2A. Thereafter, cleaning device 1 moves along path 64 where cleaning device 1 moves back and forth in passage 62 parallel to wall 2.

In the example shown in FIG. 19B, the mobile robot moves in passage 62, which is the second region, after the movement in passage 61, which is the first region, is finished. The mobile robot moves in passage 62 such that wall 2B or 2D, defining passage 62, is positioned within a measurement distance range of range finding sensor 12. During movement in passage 62, cleaning device 1 has predetermined path 59 which extends into passage 61 and hence, cleaning device 1 can detect wall 2A which is in contact with point 100 and a region around point 100. With such a configuration, it is possible to detect a region which becomes a blind spot of range finding sensor 12 when cleaning device 1 is positioned in passage 62. In the case where the mobile robot moves in the first region after the movement in the second region is finished, the mobile robot may have a predetermined path which extends into passage 62 during movement in passage 61. Further, the mobile robot can return to a charger installed in the first region after the mobile robot moves through regions included in the environment in sequence. As described above, the mobile robot can move along a more appropriate movement path.

The mobile robot may further have the following characteristics.

That is, it may be configured such that the mobile robot moves along one of the plurality of wall surfaces which define the first region so that the mobile robot moves to satisfy the first movement when the mobile robot enters the second region. Alternatively, it may be configured such that the mobile robot moves along one of the plurality of wall surfaces which define the second region so that the mobile robot moves in the second region so as not to satisfy the second movement when the mobile robot enters the first region.

In the example shown in FIG. 19B, in the case where the mobile robot moves in passage 62 such that wall 2B or 2D is positioned within the measurement distance range of range finding sensor 12, the mobile robot has path 58 which is a portion of a straight line obtained by causing a portion of path 64 to extend parallel to wall 2B or 2D. Path 58 is a path in passage 61. To be more specific, path 58 corresponds to a straight line extending parallel to wall 2B or 2D from a point where path 64 intersects with the above-mentioned border line, or from a point where path 64 reaches a predetermined distance from the border line. That is, during movement in passage 62, the mobile robot has a path where the mobile robot moves in passage 61, the movement corresponding to the first movement. Further, in the example shown in FIG. 19B, in the case where the mobile robot moves in passage 61 such that wall 2A, 2E, or 2G is positioned within the measurement distance range of range finding sensor 12, the mobile robot does not have a path where the mobile robot moves in passage 62. That is, during movement in passage 61, the mobile robot does not have a path where the mobile robot moves in passage 62, the movement corresponding to the second movement.

Modification of Embodiment

This modification shows another example of conversion of a path performed by converter 24.

Figure 23:
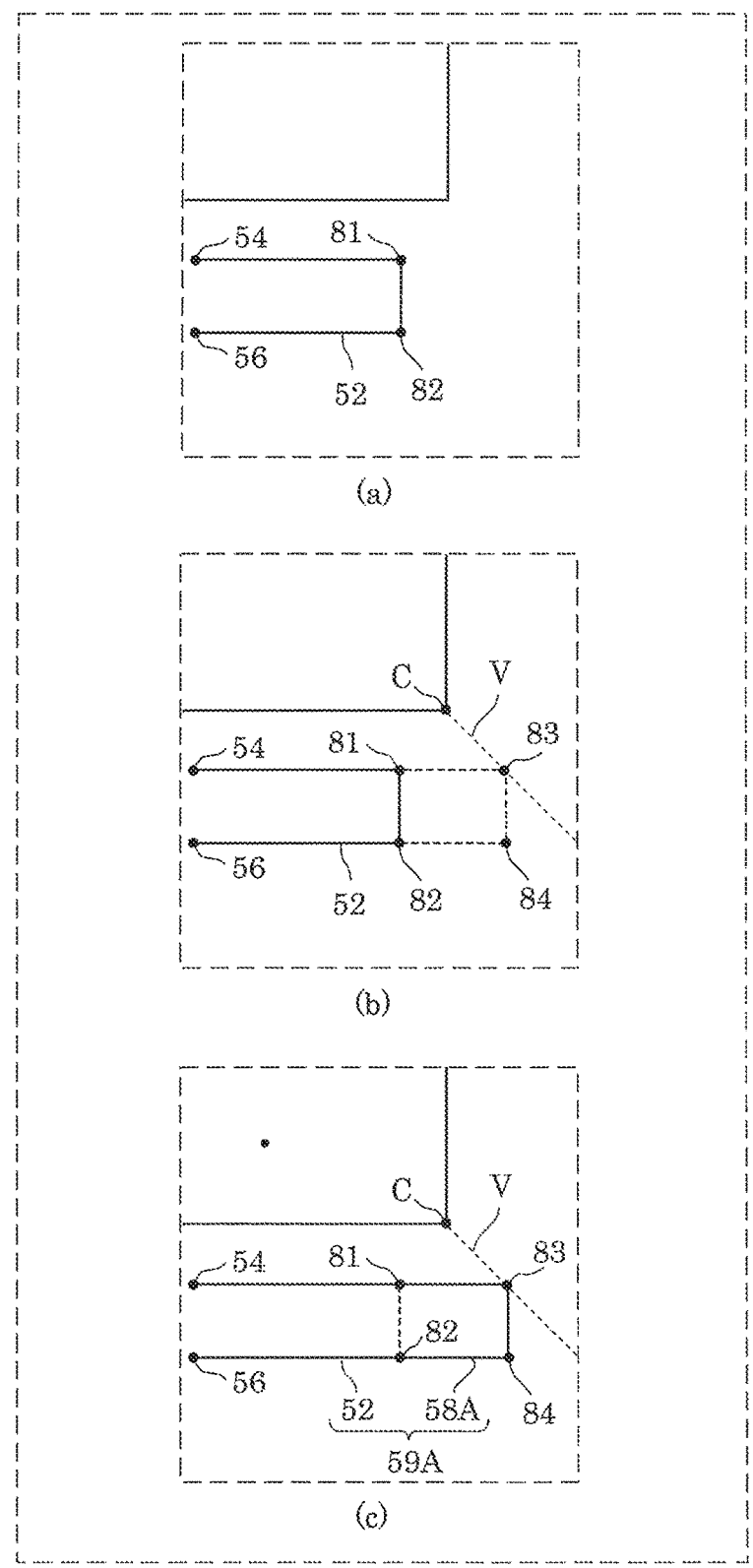
FIG. 23 is an explanatory view showing conversion of the movement path performed by a converter in a modification of the embodiment.

FIG. 23 is an explanatory view showing conversion of a movement path performed by converter 24 according to this modification.

(a) in FIG. 23 shows path 52 which is a path before conversion. Path 52 is a path which extends from start point 54, and reaches end point 56 through point 81 and point 82.

(b) in FIG. 23 shows conversion of the movement path performed by converter 24 in this modification. Using the same method as the embodiment, first identification unit 22 identifies feature point C, and second identification unit 23 sets virtual line segment V with respect to path 52.

Next, converter 24 according to this modification causes a straight line which connects start point 54 and point 81 with each other to extend from point 81, and converter 24 sets point 83 where this extension and virtual line segment V intersect with each other. Next, converter 24 causes a straight line which connects end point 56 and point 82 with each other to extend from point 82. Converter 24 causes a perpendicular line to extend downward toward the extension from point 83, and converter 24 sets point 84 as a point of intersection between the perpendicular line and the extension. Then, converter 24 deletes a portion ranging from point 81 to point 82 from path 52, and adds, to path 52, path 58A which passes through point 81, point 83, point 84, and point 82 in this order, thus converting the path ((c) in FIG. 23).

The line which is caused to extend downward from point 83 toward the extension of the straight line which connects end point 56 and point 82 by converter 24 may not be a perpendicular line. It is sufficient that the line intersects with the extension at an arbitrary angle. Further, such a line may not be a straight line, but may be a curved line.

Figure 24A:
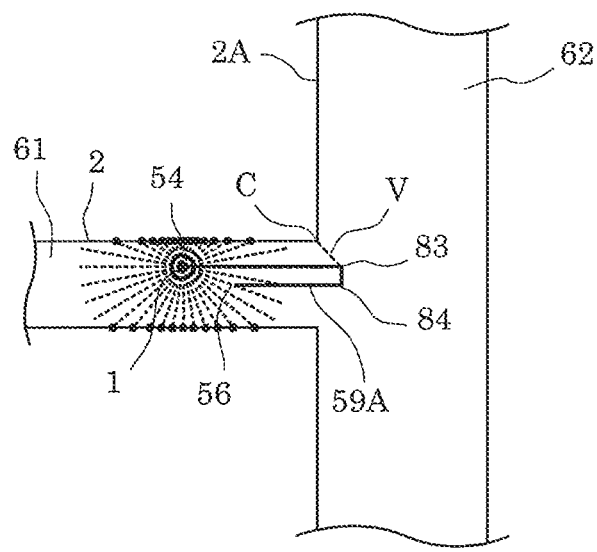
FIG. 24A is a first explanatory view showing range finding performed when a cleaning device according to the modification of the embodiment moves along the converted path.
Figure 24A:
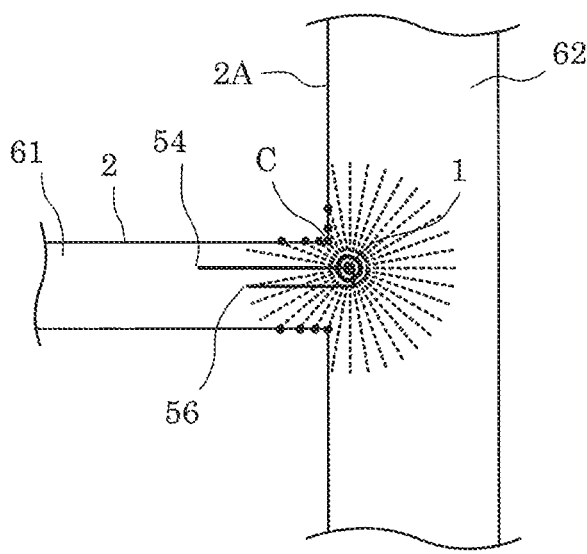
Figure 24B:
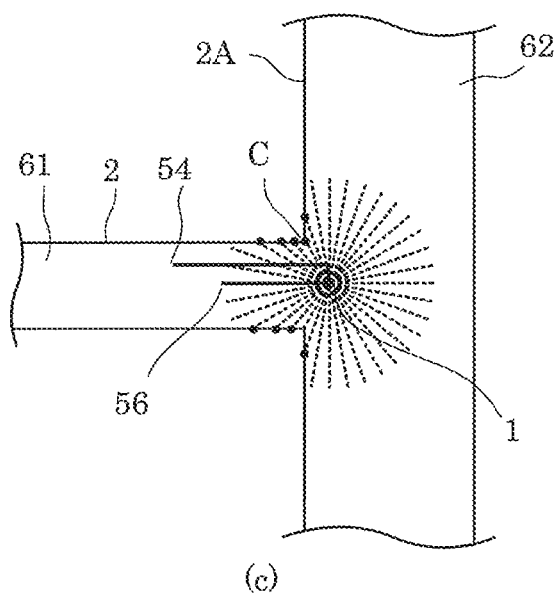
FIG. 24B is a second explanatory view showing range finding performed when the cleaning device according to the modification of the embodiment moves along the converted path.
Figure 24B:
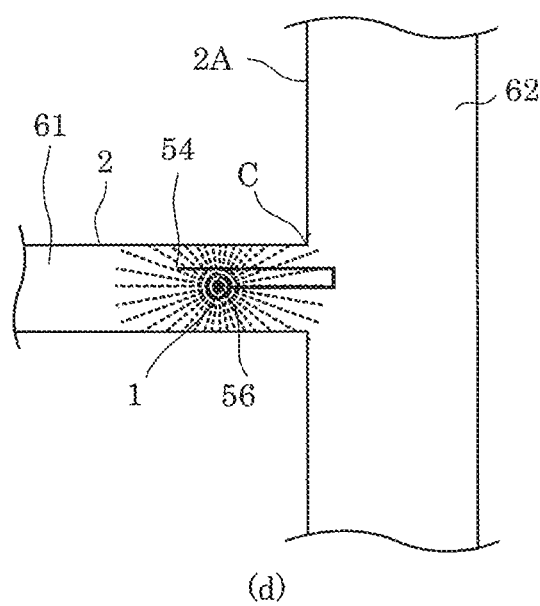
Figure 25:
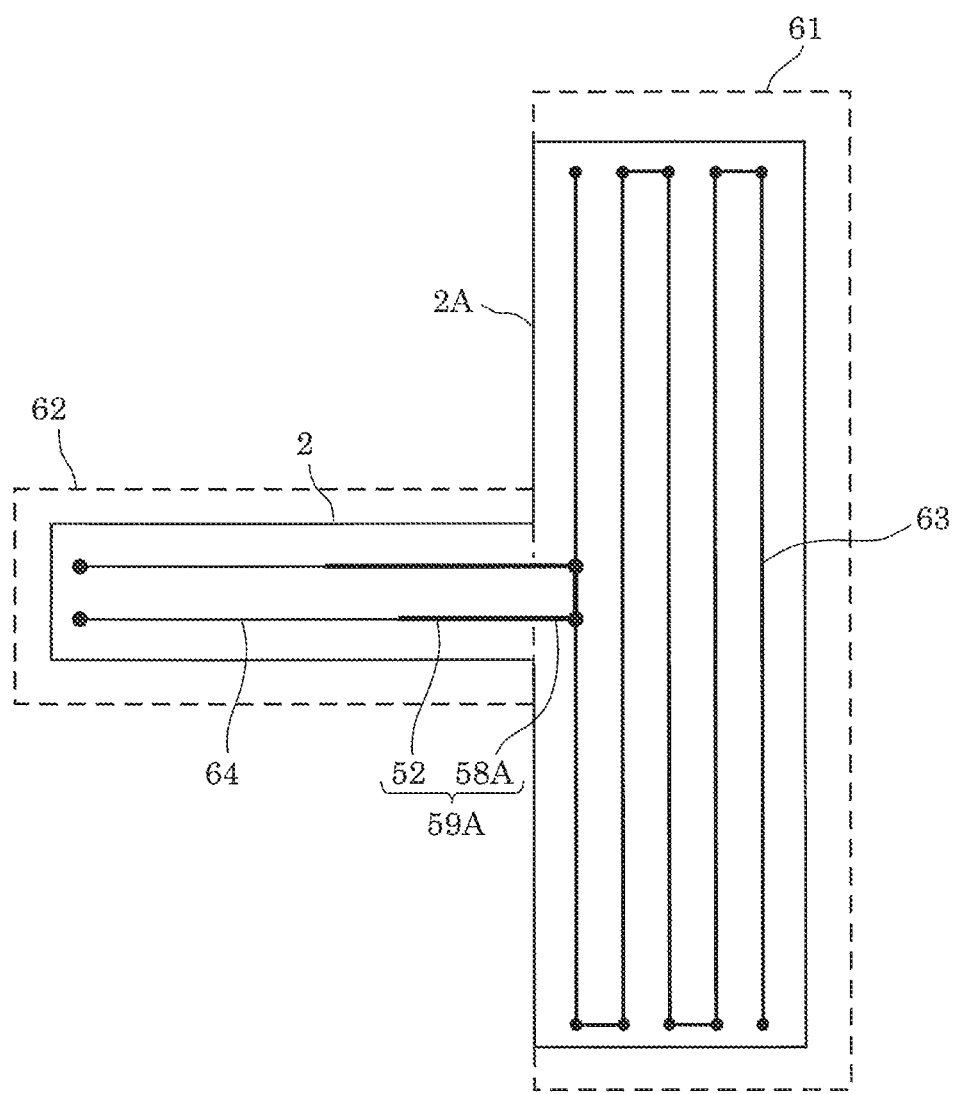
FIG. 25 is an explanatory view of the converted path of the cleaning device according to the modification of the embodiment.

FIG. 24A and FIG. 24B are explanatory views showing a third example of the converted movement path in this modification. FIG. 25 is an explanatory view of the converted path of the cleaning device according to the modification of the embodiment.

FIG. 24A and FIG. 24B are explanatory views showing objects on which range finding can be performed when cleaning device 1 of this modification moves along the converted movement path. FIG. 24A and FIG. 24B show, with black dots, objects on which range finding can be performed by range finding sensor 12 during the following movement of cleaning device 1. The movement starts from a state where cleaning device 1 is positioned at start point 54 ((a) in FIG. 24A). Then, cleaning device 1 moves along path 59A, thus reaching a state where cleaning device 1 is positioned at point 83 ((b) in FIG. 24A), point 84 ((c) in FIG. 24B), and end point 56 ((d) in FIG. 24B).

FIG. 25 also shows a path which is expected when cleaning device 1 thoroughly cleans passage 61 and passage 62 which include path 59A.

Objects on which range finding can be performed by range finding sensor 12 during this movement include not only points on walls 2 which are parallel to each other in passage 62, but also wall 2A in passage 61. To be more specific, when cleaning device 1 is at a position shown in (c) in FIG. 24B, range finding sensor 12 can detect both points on walls 2 and points on wall 2A. Accordingly, cleaning device 1 can appropriately perform self-position estimation when cleaning device 1 moves along path 59A.

As described above, in the case where self-position estimation is not appropriately performed if the mobile robot, which is the cleaning device of this embodiment, moves along the first path, the mobile robot changes the path to a path along which the mobile robot passes through a position at which the range finding sensor can detect a feature point. Accordingly, the mobile robot detects a feature point during movement and hence, self-position estimation can be appropriately performed. Therefore, the mobile robot can move along a more appropriate movement path.

The mobile robot detects, as a feature point, a vertex on the borderline of a region where the mobile robot is capable of moving. Accordingly, the mobile robot uses the vertex on the borderline as a feature point and hence, the mobile robot can perform self-position estimation more easily.

A virtual point is set on a virtual line segment which is set to a position equidistantly away from two borderlines forming the vertex. Accordingly, the virtual line segment having the feature point at one end of the virtual line segment is set to a position away from respective two borderlines as much as possible. As a result, the virtual point is set to a position away from respective two borderlines as much as possible. Therefore, the mobile robot can move along a more appropriate movement path with the shorter length of a path which is to be added in performing the conversion from the first path into the second path.

The mobile robot detects, as a feature point, a point closest to the first path among points on a curved portion included in the borderline of the region where the mobile robot is capable of moving. Accordingly, the mobile robot uses the above-mentioned point as a feature point and hence, the mobile robot can perform self-position estimation more easily.

A virtual point is set on the virtual line segment which is set to a position equidistantly away from the borderlines. Accordingly, the virtual line segment having the feature point at one end of the virtual line segment is set to a position away from the borderlines as much as possible. As a result, the virtual point is set to a position away from the borderlines as much as possible. Therefore, the mobile robot can move along a more appropriate movement path with the shorter length of a path which is to be added in performing the conversion from the first path into the second path.

The mobile robot can move along a more appropriate movement path with the shorter length of a path which is to be added in performing the conversion from the first path into the second path.

The mobile robot sets a virtual point within a range where range finding can be performed by the range finding sensor from the position on the first path. Accordingly, it is possible to avoid that the length of a path which is to be added in performing the conversion from the first path into the second path becomes excessively greater than the distance at which range finding can be performed by the range finding sensor.

In the case where it is assumed to convert the first path into the second path, thus causing the path to pass through the virtual point, if a relatively long distance is required for the mobile robot to return to the first path from the above-mentioned virtual point, it is possible to prevent the above-mentioned conversion from being performed. This is because in the case where the mobile robot moves along the second path, a larger difference may be assumed between the self-position estimated by the mobile robot and the actual position. Accordingly, avoiding an increase in error in self-position estimation allows the mobile robot to move along a more appropriate movement path.

The mobile robot moves in a second region after the movement in the first region is finished. Further, the mobile robot can return to the charger installed in the first region after the mobile robot moves through regions included in an environment in sequence. As describe above, the mobile robot can move along a more appropriate movement path.

In the above-mentioned respective Embodiments, the respective constitutional elements may be formed of a dedicated hardware, or may be achieved by executing a software program suitable for the respective constitutional elements. The respective constitutional elements may be achieved such that a program execution unit, such as a CPU or a processor, reads out and executes a software program recorded in a recording medium, such as a hard disk or a semiconductor memory. Software which achieves the cleaning devices of the above-mentioned respective Embodiments is the following program.

That is, this program causes a computer to execute a method for controlling a mobile robot which moves in an environment and includes a range finding sensor having a predetermined range-finding range. The method includes: acquiring a map of the environment including position information of an object, and a first path along which the mobile robot is to move in the environment; identifying a feature point which is, among points each indicating a position of the object on the map, a point where, as viewed from a direction toward the point from the mobile robot, a distance between the object and the range finding sensor varies with movement of the mobile robot along the first path; identifying a virtual point which is, among points on a virtual line segment, a point closest to the first path when the virtual line segment does not intersect with the first path, the virtual line segment extending toward the first path from the feature point, and having a maximum length within the predetermined range-finding range; converting the first path into a second path which passes through the virtual point; and causing the mobile robot to move along the second path.

The cleaning devices according to one or a plurality of aspects have been described heretofore based on the embodiments. However, the present disclosure is not limited to these embodiments. Embodiments obtained by performing various modifications conceived by those skilled in the art on the embodiment of the present disclosure and embodiments obtained by combining the constitutional elements in different embodiments may also fall within the scope of the one or the plurality of aspects without departing from the gist of the present disclosure.

INDUSTRIAL APPLICABILITY

The present disclosure can be used as a mobile robot which can move along a more appropriate movement path.

What is claimed is:

1. A mobile robot which moves in an environment, the mobile robot comprising:
   a range finding sensor having a predetermined range-finding range; and
   a processor which:
      acquires a map of the environment including position information of an object, and a first path along which the mobile robot is to move in the environment;
      identifies a feature point which is, among points each indicating a position of the object on the map, a point where, as viewed from a direction toward the point from the mobile robot, a distance between the object and the range finding sensor varies with movement of the mobile robot along the first path;
      sets a virtual line segment extending from the feature point toward the first path, the virtual line segment having a maximum length within the predetermined range-finding range, wherein (i) when the feature point is a vertex on a borderline of a region where the mobile robot is capable of moving, the virtual line segment is set on a bisector which bisects an angle formed by the borderline at the vertex, and (ii) when the feature point is a point closest to the first path among points on a curved portion included in the borderline of the region where the mobile robot is capable of moving, the virtual line segment is set on a straight line which passes through the point closest to the first path among the points on the curved line, and perpendicularly intersects with the first path;

determines whether the virtual line segment intersects with the first path;

identifies a virtual point which is, among points on the virtual line segment within a predetermined distance from the feature point, a point closest to the first path when the virtual line segment does not intersect with the first path;

sets a point on the first path closest to the virtual point as a branch point;

when a distance between the virtual point and the branch point satisfies a predetermined condition, (i) converts the first path into a second path which passes through the branch point and the virtual point and (ii) causes the mobile robot to move along the second path.

2. The mobile robot according to claim 1, wherein the processor converts the first path into the second path by adding, to the first path, a path where the mobile robot moves back and forth on a line segment connecting the branch point and the virtual point.

3. A method for controlling a mobile robot which moves in an environment and includes a range finding sensor having a predetermined range-finding range, the method comprising:

acquiring a map of the environment including position information of an object, and a first path along which the mobile robot is to move in the environment;

identifying a feature point which is, among points each indicating a position of the object on the map, a point where, as viewed from a direction toward the point from the mobile robot, a distance between the object and the range finding sensor varies with movement of the mobile robot along the first path;

setting a virtual line segment extending from the feature point toward the first path, the virtual line segment having a maximum length within the predetermined range-finding range, wherein (i) when the feature point is a vertex on a borderline of a region where the mobile robot is capable of moving, the virtual line segment is set on a bisector which bisects an angle formed by the borderline at the vertex, and (ii) when the feature point is a point closest to the first path among points on a curved portion included in the borderline of the region where the mobile robot is capable of moving, the virtual line segment is set on a straight line which passes through the point closest to the first path among the points on the curved line, and perpendicularly intersects with the first path;

determining whether the virtual line segment intersects with the first path;

identifying a virtual point which is, among points on the virtual line segment within a predetermined distance from the feature point, a point closest to the first path when the virtual line segment does not intersect with the first path;

setting a point on the first path closest to the virtual point as a branch point;

when a distance between the virtual point and the branch point satisfies a predetermined condition, (i) converting the first path into a second path which passes through the branch point and the virtual point and (ii) causing the mobile robot to move along the second path.

4. The mobile robot according to claim 1, wherein the predetermined condition is the distance between the virtual point and the branch point is less than a distance between the branch point and another point on the first path, and the another point is one of (i) when another virtual line segment extending from another feature point toward the first path intersect with the first path, a point on the first path where the first path intersects with the another virtual line segment, the another feature point indicating a position of another object on the map and (ii) when the another virtual line segment does not intersect with the first path, a point on the first path closest to another virtual point which is a point, among points on the another virtual line segment within the predetermined distance from the another feature point, closest to the first path.

* * * * *